(12) United States Patent
Trescases et al.

(10) Patent No.: US 9,673,721 B2
(45) Date of Patent: Jun. 6, 2017

(54) SWITCHING SYNCHRONIZATION FOR ISOLATED ELECTRONICS TOPOLOGIES

(71) Applicants: SOLANTRO SEMICONDUCTOR CORP., Ottawa, Ontario (CA); THE GOVERNING COUNCIL OF THE UNIVERSITY OF TORONTO, Toronto, Ontario (CA)

(72) Inventors: Olivier Trescases, Toronto (CA); Shahab Poshtkouhi, Toronto (CA); Raymond Kenneth Orr, Kanata (CA); James Benson Bacque, Ottawa (CA)

(73) Assignee: Solantro Semiconductor Corp., Ottawa, CA (US)

( * ) Notice: Subject to any disclaimer, the term of this patent is extended or adjusted under 35 U.S.C. 154(b) by 0 days.

(21) Appl. No.: 14/798,924

(22) Filed: Jul. 14, 2015

(65) Prior Publication Data
US 2016/0020702 A1    Jan. 21, 2016

Related U.S. Application Data

(60) Provisional application No. 62/025,775, filed on Jul. 17, 2014.

(51) Int. Cl.
*H02M 3/335* (2006.01)

(52) U.S. Cl.
CPC .... *H02M 3/33592* (2013.01); *H02M 3/33523* (2013.01); *Y02B 70/1475* (2013.01)

(58) Field of Classification Search
CPC ............. H02M 3/335; H02M 3/33507; H02M 3/33523; H02M 3/33553; H02M 3/33569; H02M 3/33576; H02M 3/33592
See application file for complete search history.

(56) References Cited

U.S. PATENT DOCUMENTS

| | | | |
|---|---|---|---|
| 7,859,860 B2 * | 12/2010 | Chen ................. | H02M 3/33592 363/127 |
| 2012/0307529 A1 * | 12/2012 | Chiba ..................... | H02M 1/08 363/17 |

(Continued)

OTHER PUBLICATIONS

F. Krismer and J. Kolar, "Accurate small-signal model for the Digital Control of an Automotive Bidirectional Dual Active Bridge," IEEE Transactions on Power Electronics, vol. 24, No. 12, pp. 2756-2768, 2009.

(Continued)

*Primary Examiner* — Gary L Laxton
(74) *Attorney, Agent, or Firm* — Barnes & Thornburg LLP

(57) ABSTRACT

One or more first switches coupled to one of a primary transformer winding and a secondary transformer winding are controlled based on a first switch control reference clock signal. A reflected voltage across the other of the primary and secondary windings is sensed, and a second switch control reference clock signal is synchronized to the first switch control reference clock signal based on the reflected voltage. One or more second switches coupled to the other of the primary and secondary windings are controlled based on the second switch control reference clock signal. A digital isolator could instead be used to transfer a switch control reference signal across an isolation boundary. Switch control signals for controlling a set of switches on one side of the isolation boundary may be derived from a switch control reference signal that is synchronized with the transferred switch control reference clock signal.

19 Claims, 16 Drawing Sheets

(56) References Cited

U.S. PATENT DOCUMENTS

| | | | | |
|---|---|---|---|---|
| 2014/0268894 | A1* | 9/2014 | Shinohara | H02M 3/33592 363/17 |
| 2015/0229225 | A1* | 8/2015 | Jang | H02M 3/285 363/17 |

OTHER PUBLICATIONS

H. Qin and J. Kimball, "Generalized average modeling of dual active bridge dc-dc converter," IEEE Transactions on Power Electronics, vol. 27, No. 4, pp. 2078-2084, 2012.

A. Thaduri, A. Verma, G. Vinod, and R. Gopalan, "Reliability prediction of optocouplers for the safety of digital instrumentation," in 2011 IEEE International Conference on Quality and Reliability (ICQR), Sep. 2011, pp. 491-495.

P. Jacob, G. Nicoletti, and M. Rutsch, "Reliability failures in small optocoupling and dc/dc converter devices," in 2006. 13th International Symposium on the Physical and Failure Analysis of Integrated Circuits, Jul. 2006, pp. 167-170.

S. Hui, S. C. Tang, and H.-H. Chung, "Optimal Operation of Coreless PCB Transformer-Isolated Gate Drive Circuits.with Wide Switching Frequency Range," Power Electronics, IEEE Transactions on, vol. 14, No. 3, pp. 506-514, May 1999.

L. Peng, R. Wu, X. Fang, Y. Toyoda, M. Akahane, M. Yamaji, H. Sumida, and J. Sin, "A Novel 3D TSC Transformer Technology for Digital Isolator Gate Driver Applications," in Power Semiconductor Devices and ICs (ISPSD), 2013 25th International Symposium on, May 2013, pp. 69-72.

Y. Moghe, A. Terry, and D. Luzon, "Monolithic 2.5kv rms, 1.8v;3. 3v Dual-channel 640mbps Digital Isolator in 0.5 um SOS," in SOI Conference (SOI), 2012 IEEE International, Oct 2012, pp. 1-2.

S. Kaeriyama, S. Uchida, M. Furumiya, M. Okada, T. Maeda, and M. Mizuno, "A 2.5 kV Isolation 35 kV/uS CMR 250 Mbps Digital Isolator in Standard CMOS with a Small Transformer Driving Technique," Solid-State Circuits, IEEE Journal of, vol. 47, No. 2, pp. 435-443, Feb. 2012.

L. Peng, R. Wu, X. Fang, Y. Toyoda, M. Akahane, M. Yamaji, H. Sumida, and J. Sin, "A Simple Low Cost Monolithic Transformer for High-voltage Gate Driver Applications," Electron Device Letters, IEEE, vol. 35, No. 1, pp. 108-110, Jan. 2014.

T. V. Nguyen, J.-C. Crebier, and P.-O. Jeannin, "Design and Investigation of an Isolated Gate Driver using CMOS integrated circuit and HF Transformer for Interleaved DC/DC Converter," Industry Applications, IEEE Transactions on, vol. 49, No. 1, pp. 189-197, Jan. 2013.

S. Nagai, T. Fukuda, N. Otsuka, D. Ueda, N. Negoro, H. Sakai, T. Ueda, and T. Tanaka, "A One-chip Isolated Gate Driver with an Electromagnetic Resonant Coupler using a SPDT Switch," in Power Semiconductor Devices and ICs (ISPSD), 2012 24th International Symposium on, Jun. 2012, pp. 73-76.

K. Muhammad and D.-C. Lu, "Magnetically Isolated Gate Driver with Leakage Inductance Immunity," Power Electronics, IEEE Transactions on, vol. 29, No. 4, pp. 1567-1572, Apr. 2014.

B. Chen, "iCoupler products with isoPower Technology: Signal and power transfer across Isolation Barrier using Microtransformers," Analog Devices Inc., 2006, available http://www.analog.com/static/imported-files/overviews/isoPower.pdf.

D. Costinett, M. Rodriguez, and D. Maksimovic, "Simple Digital Pulse Width Modulator under 100 pS Resolution Using General-purpose FPGAs," Power Electronics, IEEE Transactions on, vol. 28, No. 10, pp. 4466-4472, Oct. 2013.

O. Trescases, G. Wei, and W.-T. Ng, "A Segmented Digital Pulse Width Modulator with Self-calibration for Low-power SMPS," in Electron Devices and Solid-State Circuits, 2005 IEEE Conference on, Dec. 2005, pp. 367-370.

W. Stefanutti, S. Saggini, P. Mattavelli, and M. Ghioni, "Power line Communication in Digitally Controlled DC-DC Converters Using Switching Frequency Modulation," Industrial Electronics, IEEE Transactions on, vol. 55, No. 4, pp. 1509-1518, Apr. 2008.

Y.-C. Wang, Y.-C. Wu, and T.-L. Lee, "Design and Implementation of a Bidirectional Isolated Dual-Active-Bridge-Based DC/DC Converter with Dual-phase-shift Control for Electric Vehicle Battery," in 2013 IEEE Energy Conversion Congress and Exposition (ECCE), Sep. 2013, pp. 5468-5475.

D. Costinett, K. Hathaway, M. Rehman, M. Evzelman, R. Zane, Y. Levron, and D. Maksimovic, "Active balancing system for electric vehicles with incorporated low voltage bus," in 2014 Twenty-Ninth Annual IEEE Applied Power Electronics Conference and Exposition (APEC), Mar. 2014, pp. 3230-3236.

S. Poshtkouhi, M. Fard, H. Hussein, L. Dos Santos, O. Trescases, M. Varlan, and T. Lipan, "A Dual-Active-Bridge Based Bi-directional Micro-inverter with Integrated Short-term Li-ion Ultra-capacitor Storage and Active Power Smoothing for Modular PV systems," in Applied Power Electronics Conference and Exposition (APEC), 2014 Twenty-Ninth Annual IEEE, Mar. 2014, pp. 643-649.

\* cited by examiner

SWITCHING SYNCHRONIZATION FOR ISOLATED ELECTRONICS TOPOLOGIES

CROSS-REFERENCE TO RELATED APPLICATION

The present application claims the benefit of U.S. Provisional Patent Application Ser. No. 62/025,775, filed on Jul. 17, 2014, the entire contents of which are incorporated herein by reference.

FIELD OF THE INVENTION

This invention relates generally to switch mode power supplies using isolated electronics topologies and, in particular, to synchronization of switching on opposite sides of an isolation boundary.

BACKGROUND

The Dual-Active-Bridge (DAB) isolated Direct Current (DC)/DC converter is widely used for bi-directional power applications, since it offers 1) soft-switching operation, 2) a wide voltage range, 3) excellent transformer utilization, and 4) simple phase-shift power control[1], [2]. The DAB converter has a relatively large number of switches and needs precise phase synchronization across the isolation boundary.

SUMMARY

An isolated electronic apparatus includes: a transformer that includes a primary winding and a secondary winding; a first controller to control one or more first switches coupled to the primary winding; a second controller to control one or more second switches coupled to the secondary winding; a reference signal generator, coupled to one of the first controller and the second controller, to provide a first switch control reference clock signal to the one of the first controller and the second controller; a voltage sensor to sense a reflected voltage across the one of the primary winding and the secondary winding to which the other of the first controller and the second controller is coupled; and a synchronizer, coupled to the voltage sensor and to the other of the first controller and the second controller, to synchronize a second switch control reference clock signal for the other of the first controller and the second controller to the first switch control reference clock signal based on the reflected voltage.

In an embodiment, the transformer, the one or more first switches, and the one or more second switches form a DAB.

The reference signal generator is an oscillator in an embodiment.

The voltage sensor could include a comparator to generate a signal based on changes in polarity of the reflected voltage.

An example implementation of the synchronizer includes a Phase Locked Loop (PLL).

The PLL could include a Voltage Controlled Oscillator (VCO), a counter operatively coupled to the VCO, and a phase detector operatively coupled to the counter.

The VCO includes a delay line with multiple delay elements in an embodiment.

Delay between switch control signals generated by the one of the first controller and the second controller based on the first switch control reference clock signal and switch control signals generated by the other of the first controller and the second controller based on the second switch control reference clock signal, could be controlled using the counter and the delay line.

The isolated electronic apparatus could also include a PhotoVoltaic (PV) generator coupled to the primary winding or to the secondary winding. The first controller or the second controller coupled to the winding to which the PV generator is coupled could then be configured to provide Maximum Power Point (MPP) tracking for the PV generator.

In an embodiment, the isolated electronic apparatus also includes an energy store coupled to the primary winding or to the secondary winding.

The isolated electronic apparatus could include a modulator, coupled to the reference signal generator, to modulate the first switch control reference clock signal with data; and a detector, coupled to the synchronizer, to reconstruct the data.

The modulator is a frequency modulator to apply frequency modulation to modulate the first switch control reference clock signal with the data, in an embodiment.

The one of the first controller and the second controller and the reference signal generator could be implemented in a first integrated circuit, with the other of the first controller and the second controller and the synchronizer being implemented in a second integrated circuit.

A method involves: controlling one or more first switches coupled to one of a primary winding and a secondary winding of a transformer, based on a first switch control reference clock signal; sensing a reflected voltage across the other of the primary winding and the secondary winding; synchronizing a second switch control reference clock signal to the first switch control reference clock signal based on the reflected voltage; and controlling one or more second switches coupled to the other of the primary winding and the secondary winding based on the second switch control reference clock signal.

The synchronizing may involve synchronizing the second switch control reference clock signal to the first switch control reference clock signal based on changes in polarity of the reflected voltage.

In an embodiment, the synchronizing involves: using a PLL that includes a VCO, a counter operatively coupled to the VCO, and a phase detector operatively coupled to the counter, the VCO including a delay line with multiple delay elements; controlling, using the counter and the delay line, delay between first switch control signals generated to control the one or more first switches and second switch control signals generated to control the one or more second switches.

The method could be implemented in conjunction with a PV generator coupled to the primary winding or to the secondary winding, in which case controlling the one or more first switches or controlling the one or more second switches could involve controlling the one or more switches coupled to the winding to which the PV generator is coupled to provide MPP tracking for the PV generator.

The method could also involve: modulating the first switch control reference clock signal with data; and reconstructing the data in a circuitry portion coupled to the other of the primary winding and the secondary winding based on the reflected voltage.

The modulating involves applying frequency modulation to modulate the first switch control reference clock signal with the data in one embodiment.

According to another aspect of the present disclosure, an isolated electronic apparatus includes: on a first side of an isolation boundary, a first set of switches including multiple switches and a first controller coupled to control the first set of switches; on a second side of the isolation boundary, a second set of switches including multiple switches and a second controller coupled to control the second set of switches; a reference signal generator, coupled to the first controller on the first side of the isolation boundary, to provide a first switch control reference clock signal to the first controller; a digital isolator, coupled to the reference signal generator on the first side of the isolation boundary, to transfer the first switch control reference signal across the isolation boundary; and a synchronizer, coupled to the digital isolator and to the second controller on the second side of the isolation boundary, to synchronize a second switch control reference clock signal for the second controller to the first switch control reference clock signal, the second controller deriving switch control signals for controlling the second set of switches from the second switch control reference signal.

BRIEF DESCRIPTION OF THE DRAWINGS

Examples of embodiments of the invention will now be described in greater detail with reference to the accompanying drawings.

DETAILED DESCRIPTION

Example applications for high-efficiency DAB converters range from Electric Vehicle (EV) battery chargers to Photovoltaic (PV) micro-inverters with integrated storage. Example PV applications are disclosed, for example, in U.S. patent application Ser. No. 14/333,959, entitled "STABILIZED POWER GENERATION", filed on Jul. 17, 2014 claiming the benefit of U.S. Provisional Patent Application No. 61/847,761, filed Jul. 18, 2013, the entire contents of both of which are incorporated herein by reference.

Figure 1A:
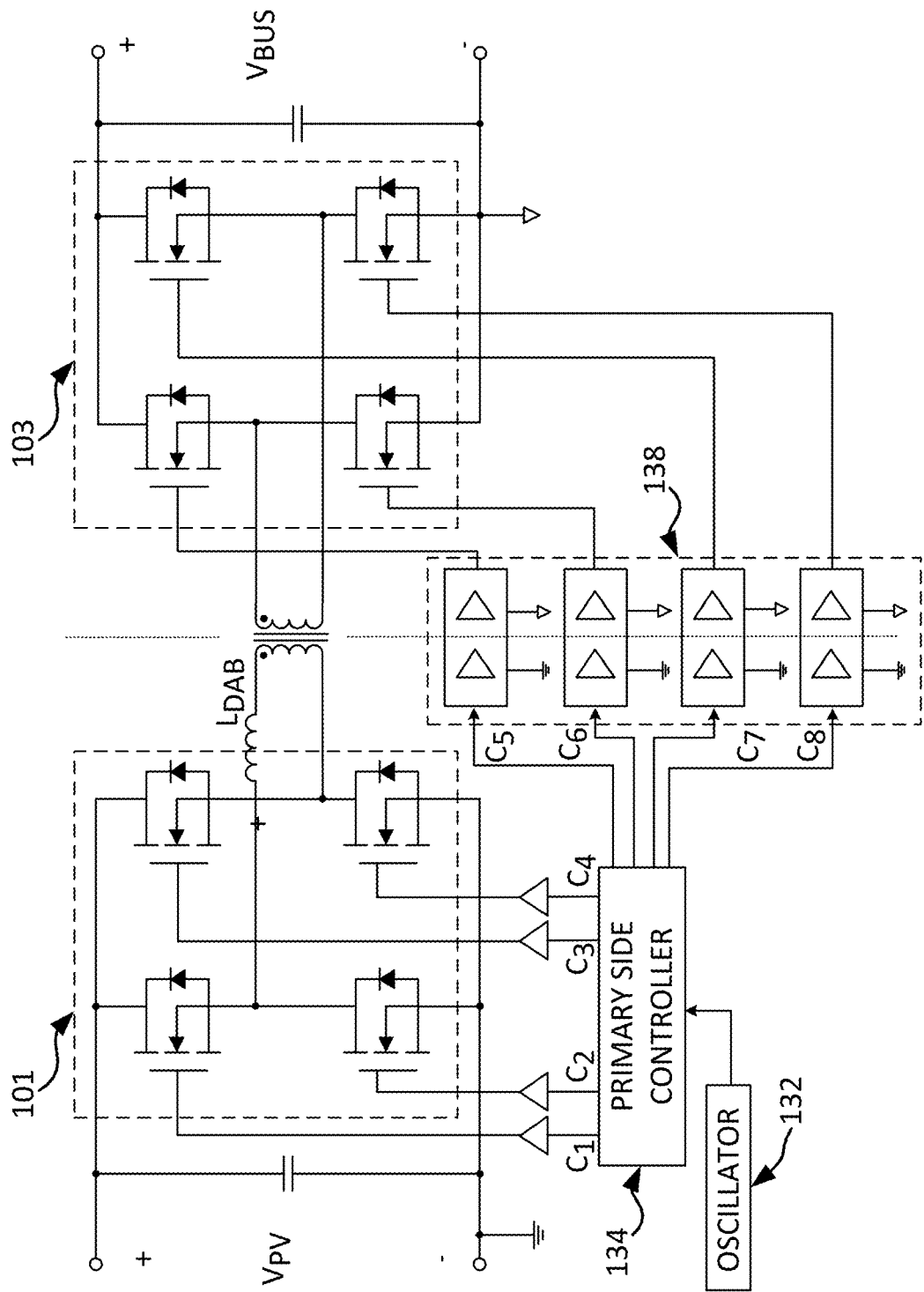
FIG. 1A is a schematic diagram of an example DAB using a conventional control signal communication approach.

FIG. 1A is a schematic diagram of an example DAB using a conventional control signal communication approach. There is one digital isolator per power transistor and a primary-side controller. Primary side controller 134 is coupled to oscillator 132 and generates control signals $C_1$, $C_2$, $C_3$, $C_4$ to control the primary side bridge 101 and control signals $C_5$, $C_6$, $C_7$, $C_8$ to control the secondary side bridge 103. Control signals $C_5$, $C_6$, $C_7$, $C_8$ are communicated to the secondary side using digital isolators 138.

Figure 1B:
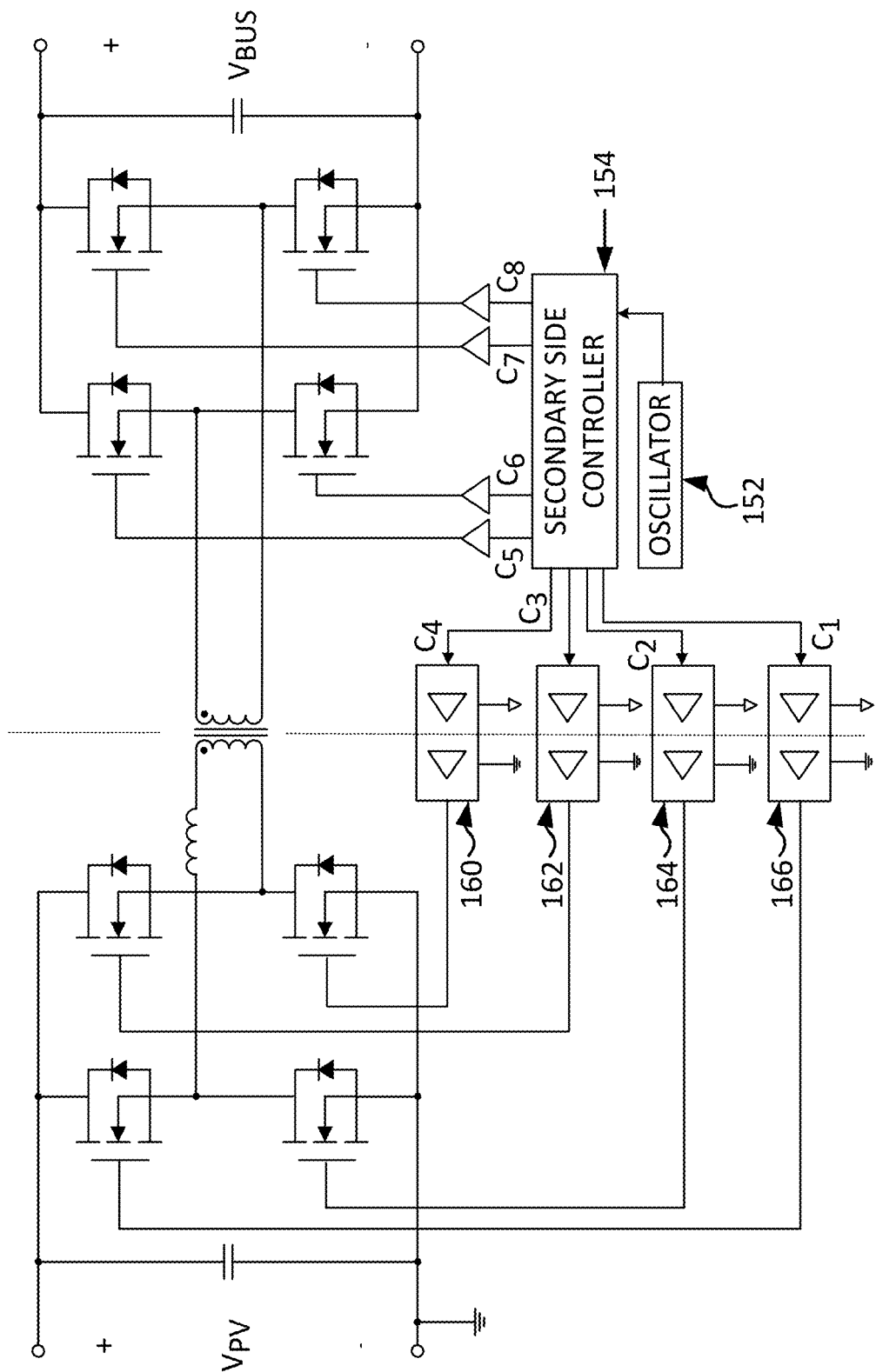
FIG. 1B is a schematic diagram of an example DAB using a conventional control signal communication approach with one digital isolator per power transistor and a secondary-side controller.

FIG. 1B is a schematic diagram of an example DAB using a conventional control signal communication approach with one digital isolator 160, 162, 164, 166 per power transistor and a secondary-side controller 154 coupled to an oscillator 152. The DAB in FIG. 1B has substantially the same structure and operates in substantially the same way as the DAB in FIG. 1A, except that the controller is on the secondary side in FIG. 1B.

Opto-isolators are a commonly used type of digital isolator, however they could be costly, suffer from undesirably long transmission delays and have short life-times at high temperature [3], [4], which is a major issue in renewable energy applications.

More recently, digital isolators based on miniaturized magnetic components either on the Printed Circuit Board (PCB) or on-chip have solved some of these shortcomings, while offering a higher level of integration. Radio Frequency (RF) based isolators use an isolation transformer and typically modulate an RF carrier with a Pulse Width Modulation (PWM) signal. To reduce the communication transformer's size the carrier frequency used is in the range of hundreds of MHz to several GHz. RF based isolators however could require precise mechanical alignment between primary and secondary-side ICs and/or specialized assembly processes. These approaches could also be susceptible to potential Electromagnetic Interference (EMI) issues.

Digital isolators based on air-core transformers integrated into the PCB usually operate below 100 MHz and require no special packaging, however they can consume more board real-estate.

Two alternative approaches are disclosed herein for driving isolated Switch Mode Power Supplies (SMPSs), and providing precise timing synchronization on both sides of an isolation boundary. A DAB converter is used as an illustrative topology however any isolated power electronics topology with active switches on both sides of an isolation barrier could use these two approaches.

The first approach is called Power Transformer Sensing (PTS). It avoids the need for digital isolators entirely, which could reduce the system cost. The second approach is called Digital Isolator Sensing (DIS). It reduces the number of isolators from four to one in the case of a DAB, while providing a versatile high-frequency communication channel.

PLL Based Synchronization Using Power Transformer Sensing (PTS)

Figure 2:
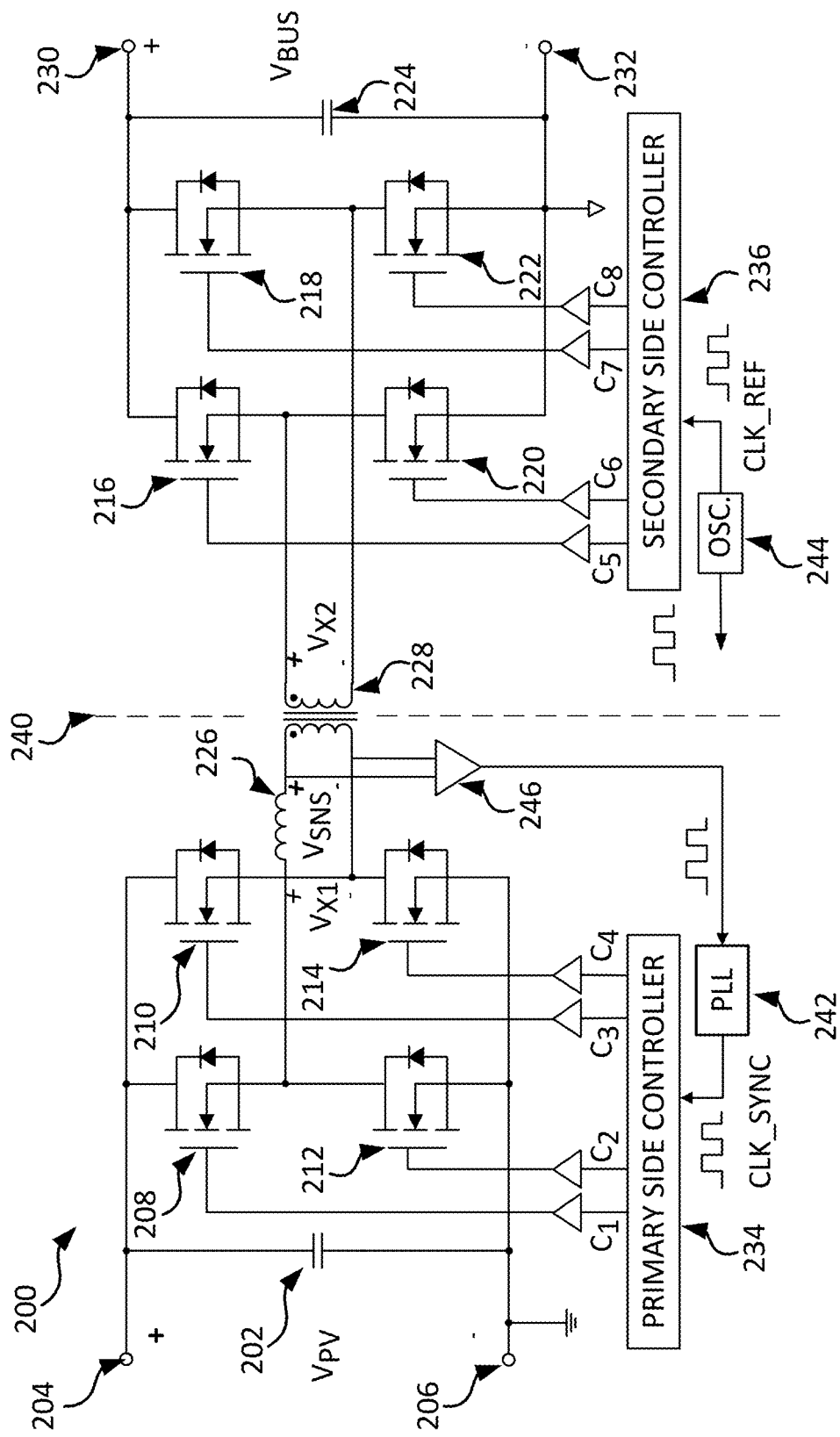
FIG. 2 is a schematic diagram of an example DAB DC/DC converter using Power Transformer Sensing.

FIG. 2 is a schematic diagram of an example DAB DC/DC converter using Power Transformer Sensing.

DAB 200 comprises a first capacitance 202 coupled between left-hand side terminal pair 204, 206, Metal Oxide Semiconductor Field Effect Transistors (MOSFETs) 208, 210, 212, 214, 216, 218, 220, 222, inductance 226 of value $L_{DAB}$, a power transformer 228 of turns ratio 1:n, a second capacitance 224 coupled between right-hand side terminal pair 230, 232, primary side controller 234, secondary side controller 236, Phase Locked Loop (PLL) 242, oscillator 244 and comparator 246. Terminal pairs 204, 206, and 230, 232 could be discrete terminals or simply connections.

Example DAB 200 is bi-directional and couples power between the terminal pair 202, 204 and terminal pair 230, 232. MOSFETS 208, 210, 212, 214 form a primary bridge and MOSFETs 216, 218, 220, 222 form a secondary bridge. The primary and secondary bridges are coupled together through inductance 226 and transformer 228. DAB 200 is divided into a primary side comprising components to the left of boundary 240 and a secondary side comprising components to the right of boundary 240.

Transformer 228 spans boundary 240 and isolates one side from the other. A voltage of value $V_{PV}$ is present across terminal pair 204, 206 and a voltage of $V_{BUS}$ is present across terminal pair 230, 232. A voltage $V_{SNS}$ is present across the primary winding of transformer 228 and a voltage $V_{X2}$ is present across the secondary winding. A voltage $V_{X1}$ is present across the circuit path that includes inductance 226 and the primary winding of transformer 228.

The gates of primary side MOSFETs 208, 210, 212, 214 are coupled to receive control or gating signals $C_1$ to $C_4$ from primary side controller 234, and the gates of secondary side MOSFETs 216, 218, 220, 222 are coupled to receive control signals $C_5$ to $C_8$ from secondary side controller 236. Controllers 234, 236 could comprise single processors or multiple processors for the calculation of various values and/or execution of algorithms, volatile and/or non-volatile memory for the storage of control software/firmware, parameters, values and/or measurements. Controllers 234, 236 could also comprise measurement modules or means such as, for example, one or more analog to digital converters for the measurement of voltages and/or currents. In one embodiment controllers 234, 236 comprise Field Programmable Gate Arrays (FPGAs) or microcontrollers. Inductance 226 could be the leakage inductance ($L_{LEAK}$) of transformer 228 and might not be a discrete inductance in some embodiments. Leakage inductance in a transformer results from the imperfect coupling of the transformers primary and secondary windings.

MOSFET pair 208, 214 and MOSFET pair 210, 212 in the primary side bridge are controlled by primary side controller 234 in a complementary fashion. When MOSFET pair 208, 214 are ON and conducting MOSFET pair 210, 212 are OFF and non-conducting, and when MOSFET pair 208, 214 are OFF and non-conducting MOSFET pair 210, 212 are ON and conducting. MOSFET pair 208, 214 and MOSFET pair 210, 212 are switched at the same switching frequency of $f_s$.

MOSFET pair 216, 222 and MOSFET pair 218, 220 in the secondary side bridge are also operated in a complementary fashion. When MOSFET pair 216, 222 are ON and conducting MOSFET pair 218, 220 are OFF and non-conducting, and when MOSFET pair 216, 222 are OFF and non-conducting MOSFET pair 218, 220 are ON and conducting. MOSFET pair 216, 222 and MOSFET pair 218, 220 are switched at the same frequency of $f_s$ as MOSFET pairs 208, 214 and 210, 212.

In one embodiment, the switching frequency $f_s$ is 156 kHz, the turns ratio of the transformer 228 is 10, the secondary side capacitance 224 has a value of 270 µF, the primary side capacitance 202 has a value of 1 mF, the inductance 226 has a value of 4.7 µH and $V_{BUS}$=420 V.

The DAB topology could be operated in soft-switching operation and use a phase-shift between the switching of the primary bridge and the secondary bridge to achieve power control.

Figure 3:
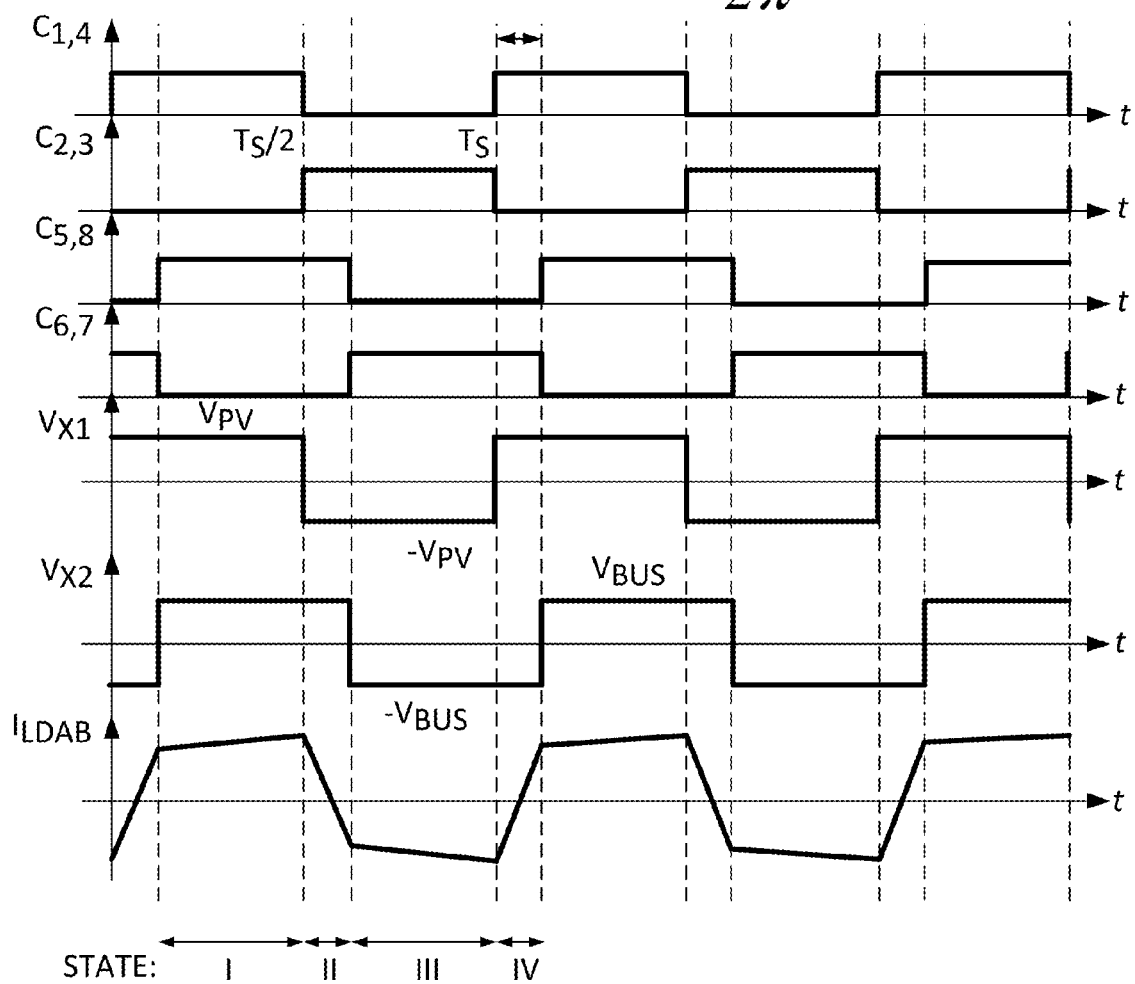
FIG. 3 is a timing diagram showing example switching waveforms of DAB converter 200 operating in steady-state.

FIG. 3 is a timing diagram showing example switching waveforms of DAB converter 200 operating in steady-state. The switching signals $C_1$-$C_8$ have a duty cycle of 50%. $I_{LDAB}$ represents the current through inductance 226. There is a time delay of $t_d$ between primary side switching signals $C_{1,4}$ and secondary side switching signals $C_{5,8}$ and the same time delay between primary side switching signals $C_{2,3}$ and secondary side switching signals $C_{6,7}$. The average power transferred from terminal pair 204, 206 to terminal pair 230, 232 ($P_{DAB}$), is given by the equation $$P_{DAB} = \frac{V_{PV} V_{BUS}}{n \omega_s L_{DAB}} \phi \left(1 - \frac{|\phi|}{\pi}\right)$$

where n is the turns ratio of transformer 228, $L_{DAB}$ is the value of DAB inductance 226, (which is the sum of transformer 228's leakage inductance, $L_{leak}$, and an optional external inductance, $L_{ext}$ from, for example, a discrete inductor), $\phi$ is the phase-shift between the switching signals of the primary and secondary bridges, and $\omega_s = 2\pi f_s$, where $f_s$ is the switching frequency. Primary side controller 234 could adjusts $P_{DAB}$ by controlling the delay $t_d = \phi T_s/2\pi$. In a PV application $t_d$ might be adjusted for the purpose of Maximum Power Point Tracking (MPPT).

Referring to FIG. 2, the system reference clock, CLK_REF, is provided by oscillator 244 and couples to the secondary-side controller 236 to provide timing for control signals $C_5$-$C_8$ in the example shown. The clock used by primary-side controller 234 (CLK_SYNC) is synchronized to CLK_REF using PLL 242 and comparator 246. Comparator 246 senses the reflected voltage $V_{SNS}$(=$V_{X2}$/n) across the primary side winding of transformer 228 and provides a digital signal to PLL 242. PLL 242 produces output signal CLK_SYNC which is synchronized to CLK_REF. CLK_SYNC is provided to primary side controller 234 to provide for the timing of switching signals $C_1$-$C_4$. In this approach transformer 228 is used both for power isolation and clock synchronization. As discussed herein, the PTS approach could additionally be used to transmit arbitrary data from the secondary side to the primary side.

PTS Implementation: Clock Synchronization and Communication

Figure 4:
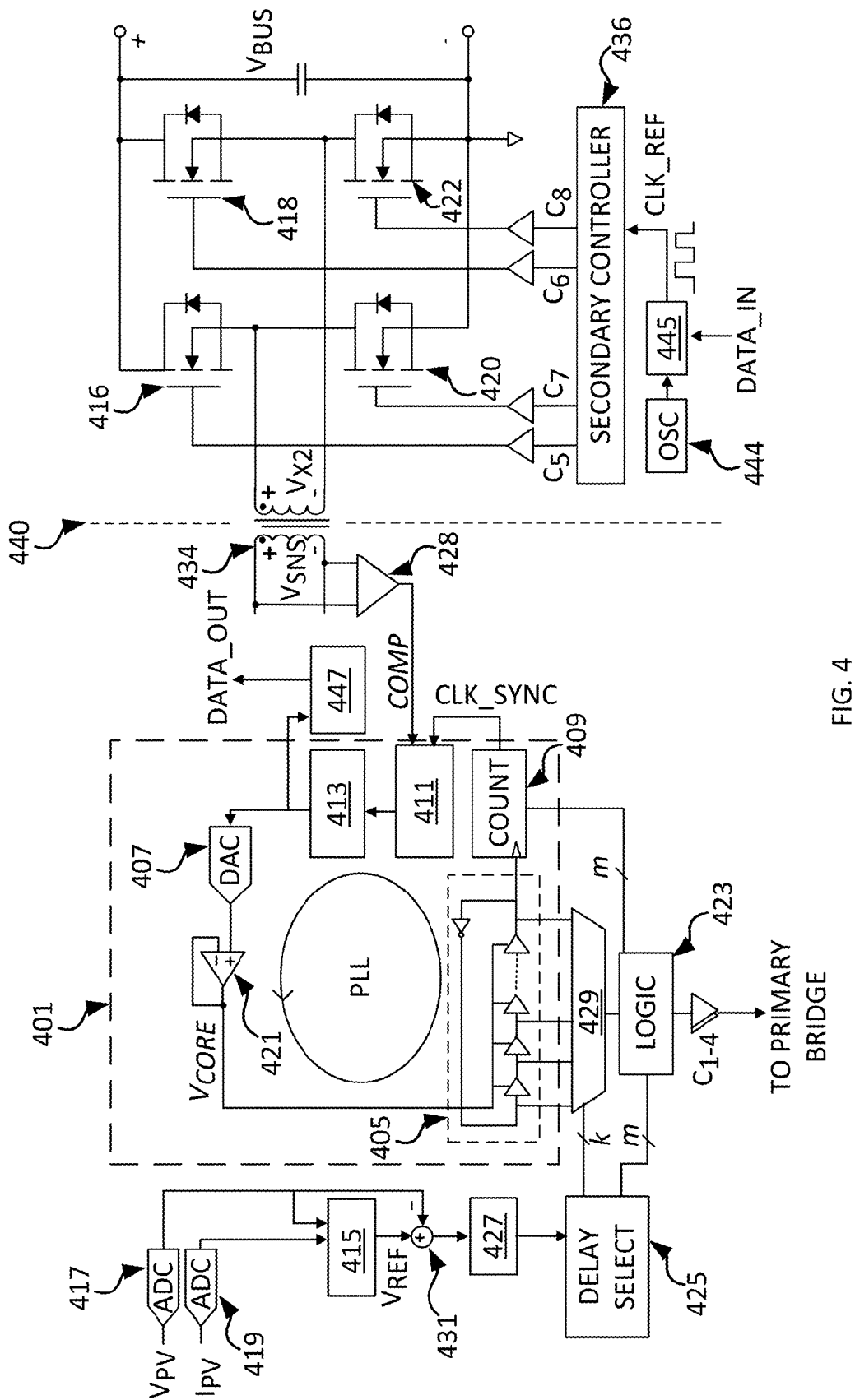
FIG. 4 is a schematic diagram of an example Phase Locked Loop (PLL) implementation for Power Transformer Sensing (PTS) clock synchronization of a DAB attached to a PhotoVoltaic (PV) panel or string of PV panels.

FIG. 4 is a schematic diagram of an example PLL implementation for PTS clock synchronization of a DAB attached to a PV panel or string of PV panels.

PLL 401 comprises VCO 405, Digital-to-Analog Converter (DAC) 407, Digital Phase Detector (DFD) 411, loop filter 413, voltage follower 421 and m-bit counter 409. Components of the primary side controller have been shown in FIG. 4 and comprise Maximum Power Point Tracking (MPPT) block 415, Analog to Digital converters (ADC) 417, 419, logic block 423, delay select 425, filter 427, multiplexor 429 and summing point 431. Primary side controller 401 may optionally also comprise communication detection block 447.

The secondary side of a DAB has also been shown in FIG. 4 to better illustrate the PTS approach. The secondary bridge comprise MOSFETs 416, 418, 420, 422 and is controlled by signals $C_5$, $C_6$, $C_7$, $C_8$ generated by secondary side controller 436. The secondary bridge couples to a primary bridge through transformer 434 (the primary side bridge of the DAB has not been shown in FIG. 4 to avoid congestion in the drawing).

Secondary side controller 436 receives a clock signal CLK_REF generated by oscillator 444. The output of the oscillator may optionally pass through and be modulated by a clock divider 445 before entering secondary side controller 436. Data could be passed from the secondary side of the DAB to the primary side by modulation of CLK_REF.

MPPT block 415 generates reference voltage, $V_{REF}$, from measurements of a PV panel voltage ($V_{PV}$) and current ($I_{PV}$). $V_{REF}$ represents the primary side input voltage that the primary controller 401 of the DAB will control to. In this example, $V_{PV}$ and $I_{PV}$ are converted to digital signals by Analog to Digital Converters (ADCs) 417, 419 before entering MPPT block 415 however analog implementations are also possible. $V_{PV}$ is subtracted from $V_{REF}$ at summing point 431 and the difference is passed through filter 427 and to delay select block 425. It should be appreciated that disclosed embodiments are not in any way limited to power conversion for PV implementations.

In one embodiment, the majority of the functionality is implemented in the digital domain within an FPGA, although other implementations such as a single chip implementation are also possible.

Comparator 428 coupled across the primary winding of the DAB transformer 434 generates the COMP signal when the sense signal, $V_{SNS}$, changes polarity. Neglecting sensing delays, the COMP signal is in-phase with CLK_REF signal generated by oscillator 444.

Voltage Controlled Oscillator (VCO) 405, which could be implemented within the FPGA for example, is constructed using a ring oscillator comprised of "$2^k$" delay elements, whose supply voltage ($V_{CORE}$) is adjusted by a Digital-to-Analog Converter (DAC) 407. In one embodiment the delay elements are non-inverting buffers and "k" is 9. In an on-chip implementation, the delay control could be implemented using current-starved delay elements, for example.

The output of VCO 405 is divided by an m-bit counter 409 to produce primary side clock signal CLK_SYNC. The value of "m" is selected by delay select block 425. In one embodiment "m" has a maximum value of 3. Digital phase detector 411 receives the CLK_SYNC and COMP signals. Digital phase detector 411 and loop filter 413 adjust the input voltage of DAC 407 such that the frequency of VCO 405 is locked to $2^m f_s$, while the phase of CLK_SYNC is aligned to CLK_REF. For an on-chip implementation, loop filter 413 may be an analog filter (in which case DAC 407 is no longer needed) or a digital filter, depending, for example, on the choice of the chip fabrication process. Delay select block 425 adjusts multiplexor 429 and m-bit counter 409 to select the appropriate delay of control signals $C_1$-$C_4$ (produced by logic block 423) to adjust $V_{PV}$ to a value of $V_{REF}$.

Similar to hybrid Digital Pulse-Width Modulators, the use of a counter and delay line combination with a total resolution of k+m bits allows a flexible trade-off between power consumption and area real-estate for on-chip implementation. The delay line (which comprises the $2^k$ delay elements of VCO 405) allows a high resolution phase shift control to be implemented, in this case for the purpose of regulating the PV panel input voltage $V_{PV}$ to $V_{REF}$.

Figure 5A:
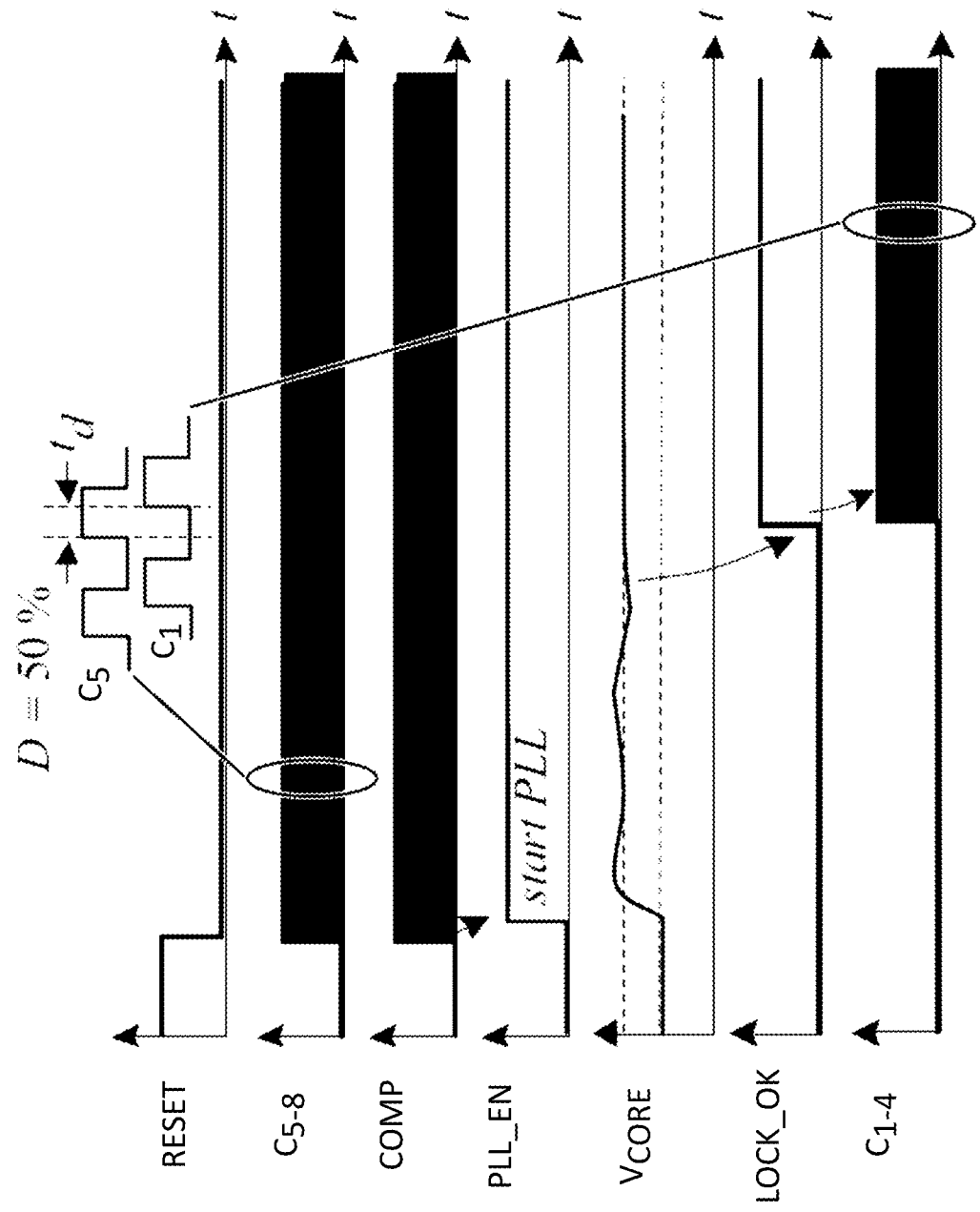
FIG. 5A is a timing diagram illustrating an example startup sequence for the PTS approach.

FIG. 5A is a timing diagram illustrating an example startup sequence for the PTS approach. When the RESET signal is asserted low, the secondary-side controller (436 in FIG. 4 for example) begins generating secondary bridge switching signals $C_5$-$C_8$. Switching signals $C_5$-$C_8$ result in the generation of the COMP signal (generated by comparator 428 of FIG. 4 for example). Once multiple transitions of the COMP signal are detected, a PLL enable signal (PLL_EN) is asserted high and the PLL is enabled, locking CLK_SYNC to CLK_REF by adjusting $V_{CORE}$. When a lock is detected within the phase detector, a LOCK_OK signal is asserted which causes the generation of the primary bridge gating pulses $C_1$-$C_4$. The phase offset between the primary and secondary side bridges is then separately controlled for MPP tracking (by MPPT block 415 of FIG. 4 for example).

This type of synchronization approach can also or instead be used to transmit arbitrary data from one side of the DAB to the other side with minimal additional hardware, by modulating the switching frequency ($f_s$). Frequency modulation has been successfully demonstrated in other Power Line Communication (PLC) approaches [16], for example.

Figure 5B:
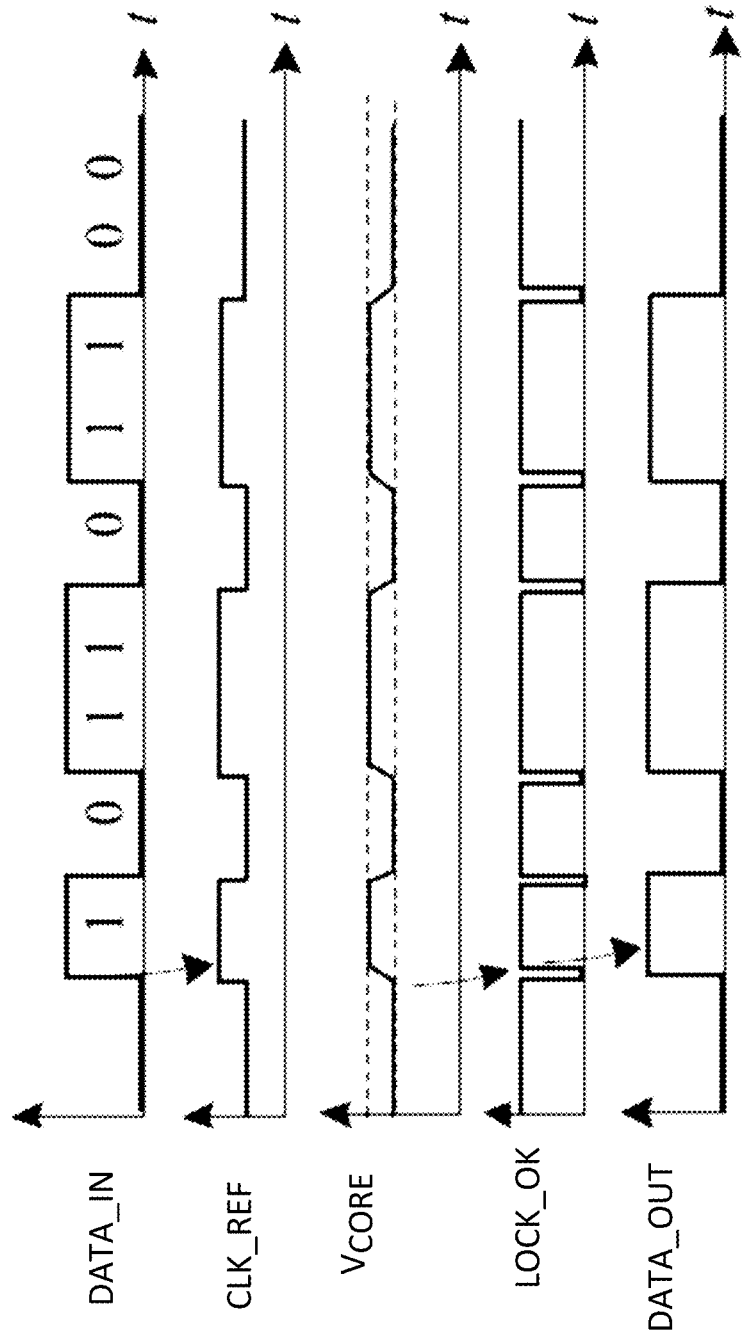
FIG. 5B is a timing diagram illustrating secondary side to primary side communication based on frequency modulation.

Frequency modulation could be used to transmit high-level supervisory commands, temperature information, configuration parameters, etc. FIG. 5B is a timing diagram illustrating secondary side to primary side communication based on frequency modulation. When communication is enabled, the DATA_IN bit stream modulates the reference frequency CLK_REF on the secondary-side. This could be accomplished using, for example, clock divider 445, as shown in FIG. 4. On the primary-side, this change in frequency causes the PLL to temporarily go out of lock and the LOCK_OK signal to go low. The PLL then adjusts $V_{CORE}$ upwards to bring the PLL back into lock at which time the LOCK_OK signal goes high again. The DATA_IN signal is reconstructed based on the deviation in the locked frequency from the nominal value (by, for example, communication detection block 447 of FIG. 4) to produce a DATA_OUT signal which corresponds to the original DATA_IN.

The maximum communication bit-rate rate is determined by the switching frequency and PLL locking time. In many power electronics applications including PV, a bit-rate in the few kbps range could be acceptable for supervisory functions.

PLL Based Synchronization with Digital Isolator Sensing (DIS)

Figure 6:
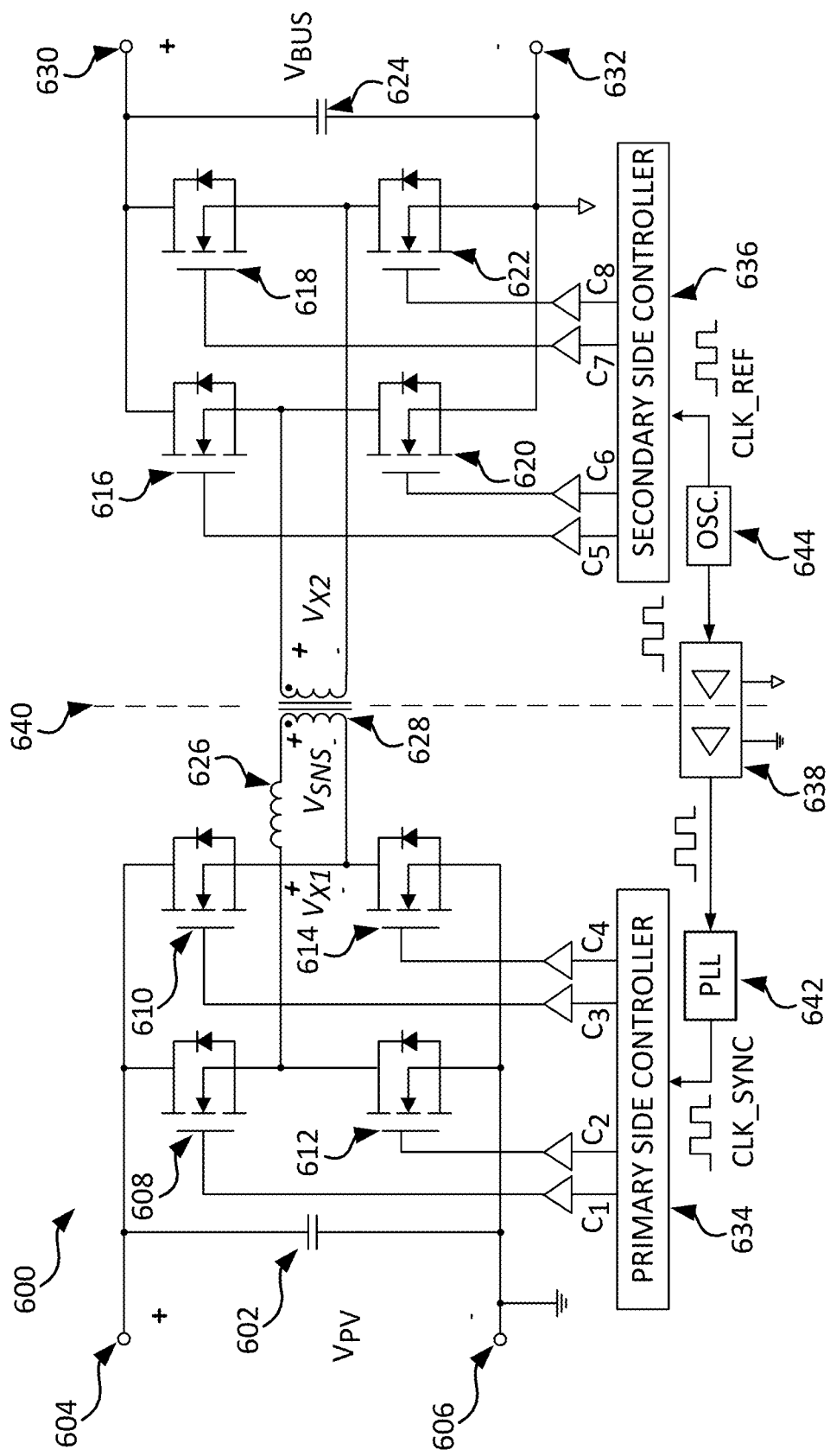
FIG. 6 is a schematic diagram of a DAB DC/DC converter with a PLL based gate-drive synchronization using a single digital isolator.

FIG. 6 is a schematic diagram of a DAB DC/DC converter with a PLL based gate-drive synchronization using a single digital isolator.

DAB 600 comprises a first capacitance 602 coupled between left-hand side terminal pair 604, 606, MOSFETs 608, 610, 612, 614, 616, 618, 620, 622, inductance 626 of value $L_{DAB}$, a transformer 628 of turns ratio 1:n, a second capacitance 624 coupled between right-hand side terminal pair 630, 632, primary side controller 634, secondary side controller 636, Phase Locked Loop (PLL) 642, oscillator 644 and digital isolator 638. Terminal pairs 604, 606, 630, 632 could be discrete terminals or simply connections.

Example DAB 600 is bi-directional and couples power between terminal pair 604, 606 and terminal pair 630, 632. MOSFETS 608, 610, 612, 614 form a primary bridge and MOSFETs 616, 618, 620, 622 form a secondary bridge. The bridges couple together through inductance 626 and transformer 628. DAB 600 is divided into a primary side comprising all components to the left of boundary line 640 and a secondary side comprising all components to the right of boundary line 640. A voltage of value $V_{PV}$ is present across terminal pair 604, 606 and a voltage of $V_{BUS}$ is present across terminal pair 630, 632.

The gates of primary side MOSFETS 608, 610, 612, 614 are coupled to receive control or gating signals $C_1$ to $C_4$ from primary side controller 634, and the gates of secondary side MOSFETS 616, 618, 620, 622 are coupled to receive control signals $C_5$ to $C_8$ from secondary side controller 636. Controllers 634, 636 could comprise a processor or multiple processors for the calculation of various values and/or execution of algorithms, volatile and/or non-volatile memory for the storage of control software/firmware, parameters, values and/or measurements. Controllers 634, 636 could also comprise measurement modules or means such as, for example, one or more analog to digital converters for the measurement of voltages and/or currents. In one embodiment each of the controllers 634, 636 comprises a Field Programmable Gate Array (FPGA) or a microcontroller. Inductance 626 could be the leakage inductance ($L_{LEAK}$) of transformer 628 and might not be a discrete inductance in some embodiments. Leakage inductance in a transformer represents the imperfect coupling of the transformer's primary and secondary windings. The system reference clock, CLK_REF, is provided by oscillator 644 and couples to secondary-side controller 636 in the example shown.

In this example, digital isolator 638 transmits the system reference clock from the secondary-side to the primary-side.

The system reference clock frequency could be chosen to be much higher than the switching frequency, $f_s$, of DAB converter 600 to reduce the size of a transformer-based digital isolator, for example. In this case oscillator 644 could produce the high frequency CLK_REF signal and secondary side controller 636 could generate the lower frequency control signals $C_5$, $C_6$, $C_7$, $C_8$. There are also other digital isolator options, such as opto-isolators, capacitive based isolators, isolated gate-drivers based on miniaturized magnetic components, and RF based isolators. The present disclosure is in no way limited to any specific type of digital isolator.

PLL 642 on the primary side is used to achieve clock recovery and generate the primary side clock signal CLK_SYNC. CLK_SYNC provides the timing base for generating control signals $C_1$ to $C_4$ and controlling the primary-side switches 608, 610, 612, 614. Similar to FIG. 1, this approach can be reversed such that the reference clock is produced from an oscillator on the primary-side and a PLL on the secondary side can be used synchronize the secondary-side clock.

DIS Implementation: PLL and Communication Approach

Figure 7:
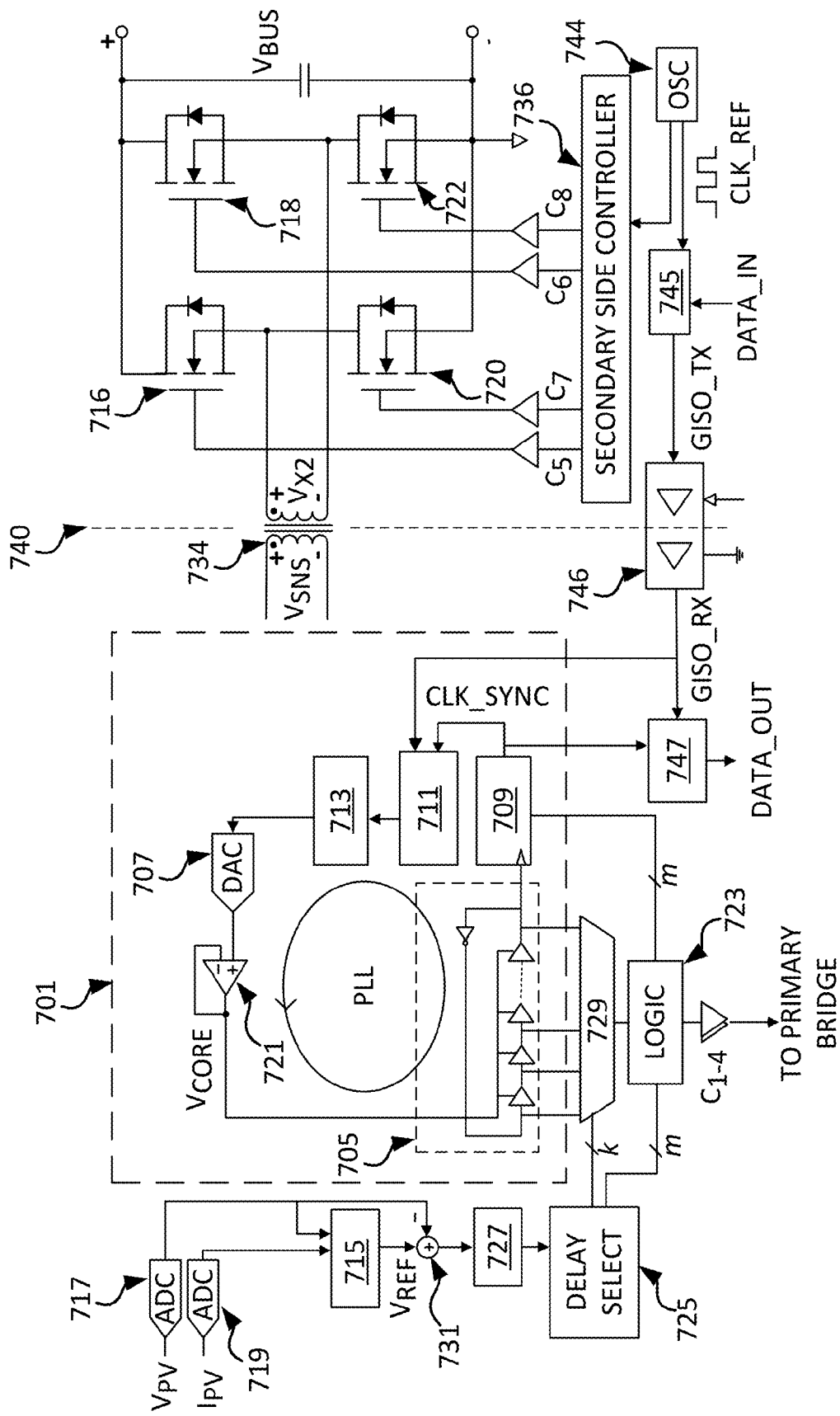
FIG. 7 is a schematic diagram of an example PLL implementation suitable for DIS clock synchronization of a DAB attached to a PV panel or string of PV panels.

FIG. 7 is a schematic diagram of an example PLL implementation suitable for DIS clock synchronization of a DAB attached to a PV panel or string of PV panels.

This example represents an FPGA based implementation for the DIS approach, although other implementations such as a custom Integrated Circuit (IC) are also possible. In this example clock synchronization for controlling the DAB converter, as well as transmission of arbitrary data on a single channel, is possible.

PLL 701 comprises VCO 705, Digital-to-Analog Converter (DAC) 707, Digital Phase Detector (DFD) 711, loop filter 713, voltage follower 721, and m-bit counter 709. Components of the primary side controller are shown in FIG. 7 and comprise Maximum Power Point Tracking (MPPT) block 715, Analog to Digital converters (ADC) 717, 719, logic block 723, delay select 725, filter 727, multiplexor 729 and summing point 731. Primary side controller 701 may optionally also comprise decoder 747.

The secondary side of a DAB has also been shown in FIG. 7 to better illustrate the DIS approach. The secondary bridge comprise MOSFETs 716, 718, 720, 722 and is controlled by signals $C_5$, $C_6$, $C_7$, $C_8$ generated by secondary side controller 736. The secondary bridge couples to a primary bridge through transformer 734 (the primary side bridge of the DAB has not been shown in this figure to avoid congestion in the drawing).

Secondary side controller 736 receives a clock signal CLK_REF generated by oscillator 744. CLK_REF may optionally pass through and be modulated by encoder 745 to produce modulated clock signal GISO_TX. Modulation of CLK_REF could be by data to be passed from the secondary side of the primary side through digital isolator 746. For example, encoder 745 could receive signal DATA_IN and modulate CLK_REF with DATA_IN to produce signal GISO_TX as shown. Digital isolator 746 provides communication between the secondary and primary side of the DAB and produces signal GISO_RX on the primary side. GISO_RX is received by DFD 711. GISO_RX could also be optionally received by decoder 747 which could produce the decoded data signal DATA_OUT.

In a PV application, MPPT block 715 generates reference voltage, $V_{REF}$, from measurements of a PV panel voltage ($V_{PV}$) and current ($I_{PV}$). $V_{REF}$ represents the primary side input voltage that the primary side controller 701 of the DAB will control to. In this example, $V_{PV}$ and $I_{PV}$ are converted to digital signals by Analog to Digital Converters (ADCs) 717, 719 before entering MPPT block 715 however analog implementations are also possible. It should be appreciated that disclosed embodiments are not in any way limited to power conversion for PV implementations.

The implementation of the DIS synchronization approach in this example is similar to the PTS approach shown in FIG. 4. Some differences with respect to the PTS implementation are:

1) The input data (DATA_IN) is encoded with the clock signal (CLK_REF) in encoder 745 to generate a bitstream GISO_TX which is transmitted through digital isolator 746 which could be at a higher frequency than the switching frequency. It could be an integer multiple of the switching frequency, $qf_s$ where "q" is an integer. In one embodiment the switching frequency is 150 kHz and the transmission frequency is 20 MHz.

2) When the PLL is locked, VCO 705 in the primary-side controller oscillates at "m" times the frequency of CLK_REF. The PLL oscillates at the frequency of CLK_REF. The PLL could therefore operate at a frequency higher than the switching frequency $f_s$.

3) In a DIS application involving data transmission, the GISO_TX signal includes both the clock (CLK_REF) and the embedded data (DATA_IN). This approach could require a more advanced phase detector to lock CLK_SYNC to CLK_REF. In one embodiment a GISO_TX data packet includes a preamble of the unencoded CLK_REF signal without any data.

4) The timing for the start of the DAB's switching cycle is communicated by secondary-side controller 736 through the GISO_TX signal, while the phase offset between the primary and secondary bridges, $\phi$, is locally controlled on the primary-side by MPPT controller 715.

As with the PTS embodiment in FIG. 4, an on-chip implementation using current-starved delay-cells could also be used for the delay elements of VCO 705 and the PLL could be designed using an analog filter instead of digital loop filter 713, for example.

Figure 8:
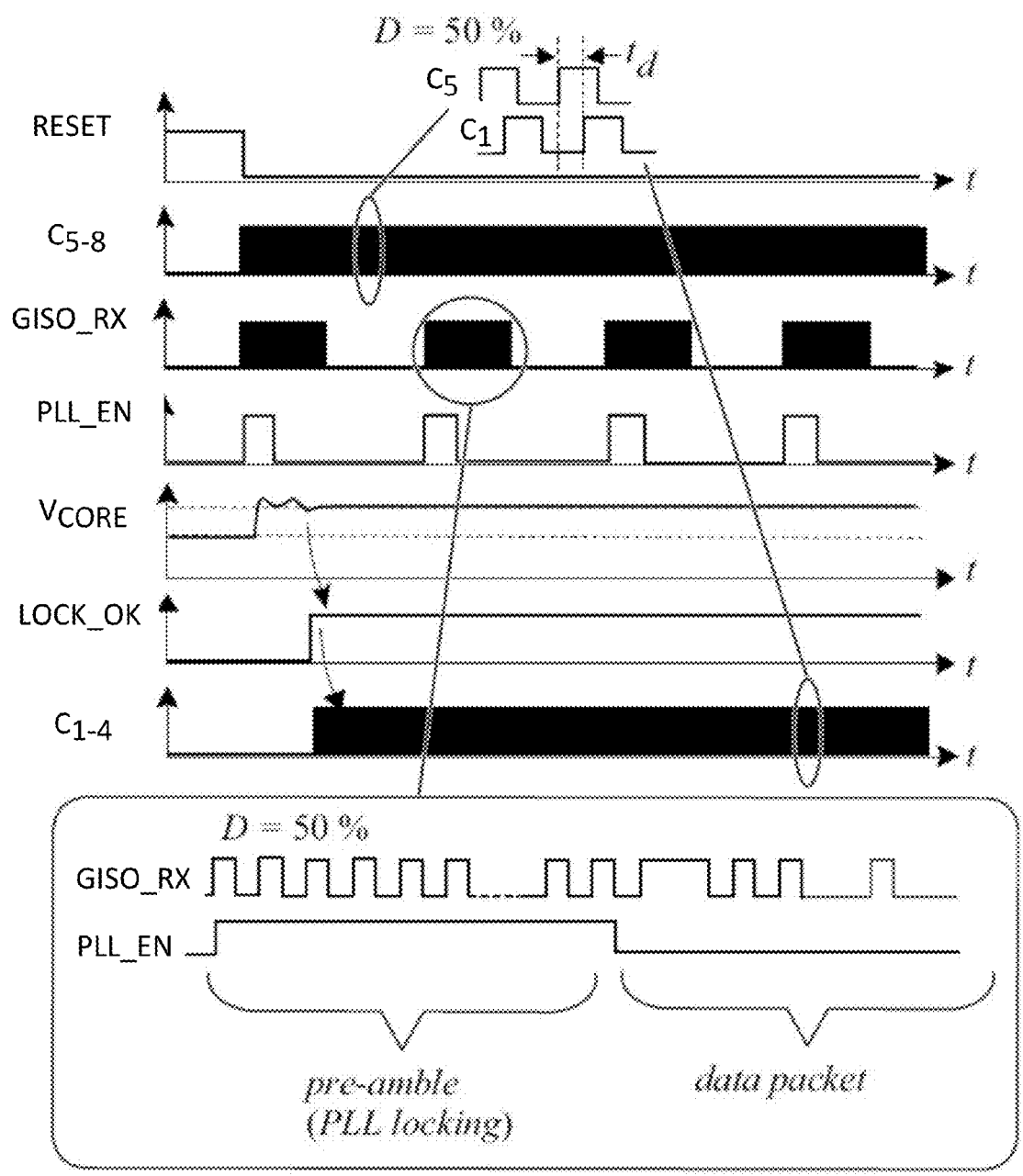
FIG. 8 is a timing diagram illustrating an example startup sequence for a DIS synchronization approach with data communication.

FIG. 8 is a timing diagram illustrating an example startup sequence for a DIS synchronization approach with data communication. In this example communication is initiated periodically, not only to transmit data but also to maintain the PLL lock.

After the RESET signal is asserted low, the secondary controller (for example 736 of FIG. 7), begins to generate switching signals $C_5$-$C_8$ to switch the secondary bridge (for example, MOSFETS 716, 718, 720, 722 of FIG. 7) and the GISO_RX signal is received by the primary side. The PLL is also enabled by assertion of a PLL enable signal (PLL_EN) high, (which could be initiated by detection of an active GISO_RX signal on the primary side). The GISO_RX signal in FIG. 8 is shown with an initial unencoded preamble, followed by an encoded data packet. The preamble provides a stable clock to allow the PLL to lock at the start of each communication cycle. Once the PLL has locked, a high LOCK_OK signal is generated. Generation of switching signals $C_1$-$C_4$ to switch the primary-side bridge begins once the PLL lock is detected. GISO_RX signals are sent at regular intervals to ensure the PLL on the primary side stays locked to the CLK_REF signal on the secondary side.

Experimental Results

A 150 W DAB converter prototype was fabricated to demonstrate the example PTS implementation of FIG. 4 and FIG. 2 with the following parameters: the switching frequency was modulated between 125 and 135 kHz, primary side capacitance 202 was 1 mF, secondary side capacitance 224 was 270 µF, turns ratio of transformer 228, 434 was 15, inductance 226 had a value of $L_{DAB}$=3.5 µH, and $V_{BUS}$ was 400 V. The nominal input voltage, $V_{PV}$, was set to 24 V during testing. Primary-side controller 234 was implemented using an FPGA evaluation board, modified to accommodate the $V_{CORE}$ modulation approach shown in FIG. 4. The FPGA was implemented in 65 nm CMOS with a nominal core voltage $V_{CORE}$=1.2 V. Secondary-side controller 236, 436 was implemented with a low-cost Complex Programmable Logic Device (CPLD) on the same circuit board as the DAB converter. Integers k and m were set to 3 and 9 inside the FPGA.

Figure 9:
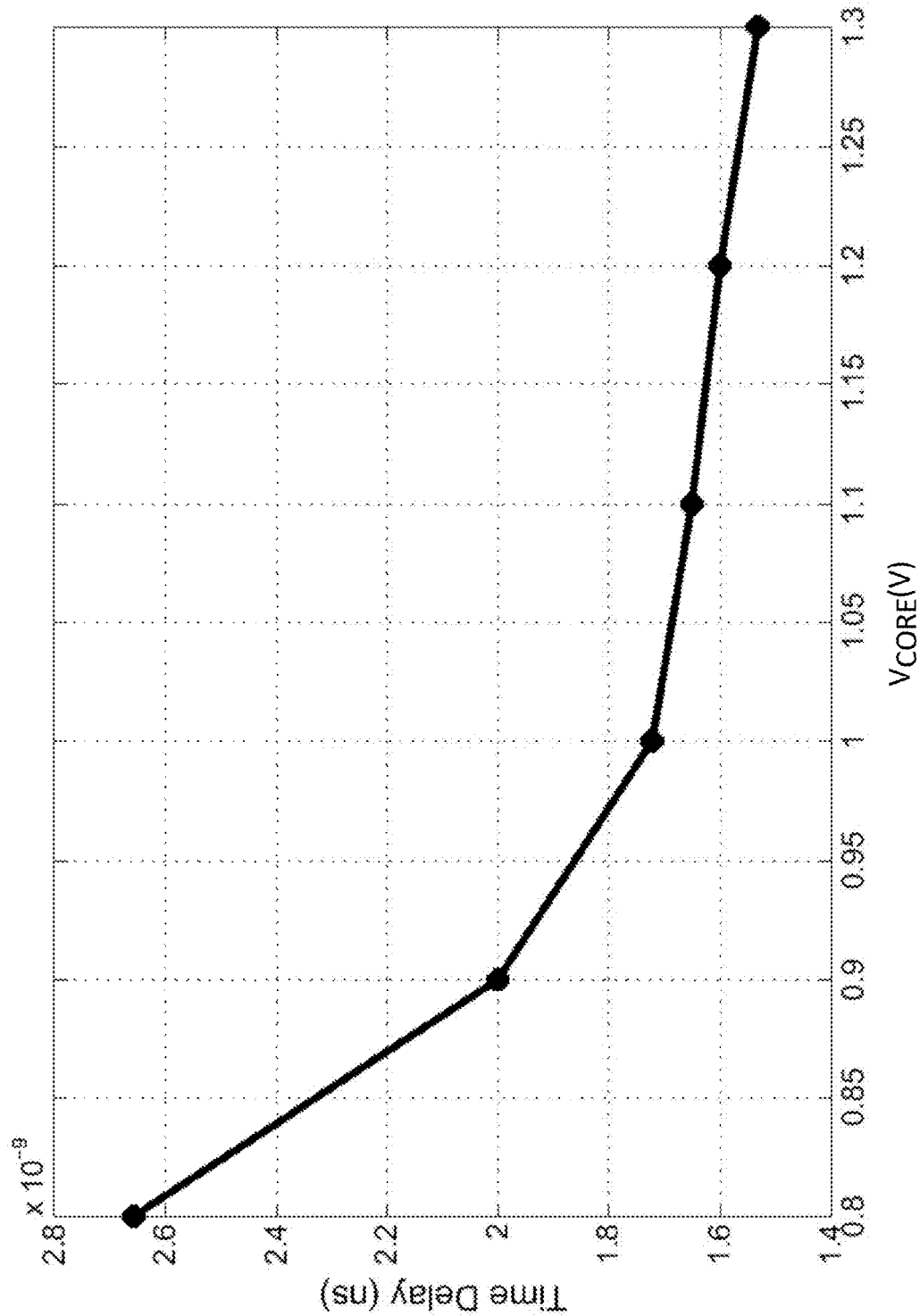
FIG. 9 is a graph showing the measured delay versus core voltage ($V_{CORE}$) for a single delay element in Voltage Controlled Oscillator (VCO) 405 of the DAB in an experimental implementation of FIG. 4.
Figure 10:
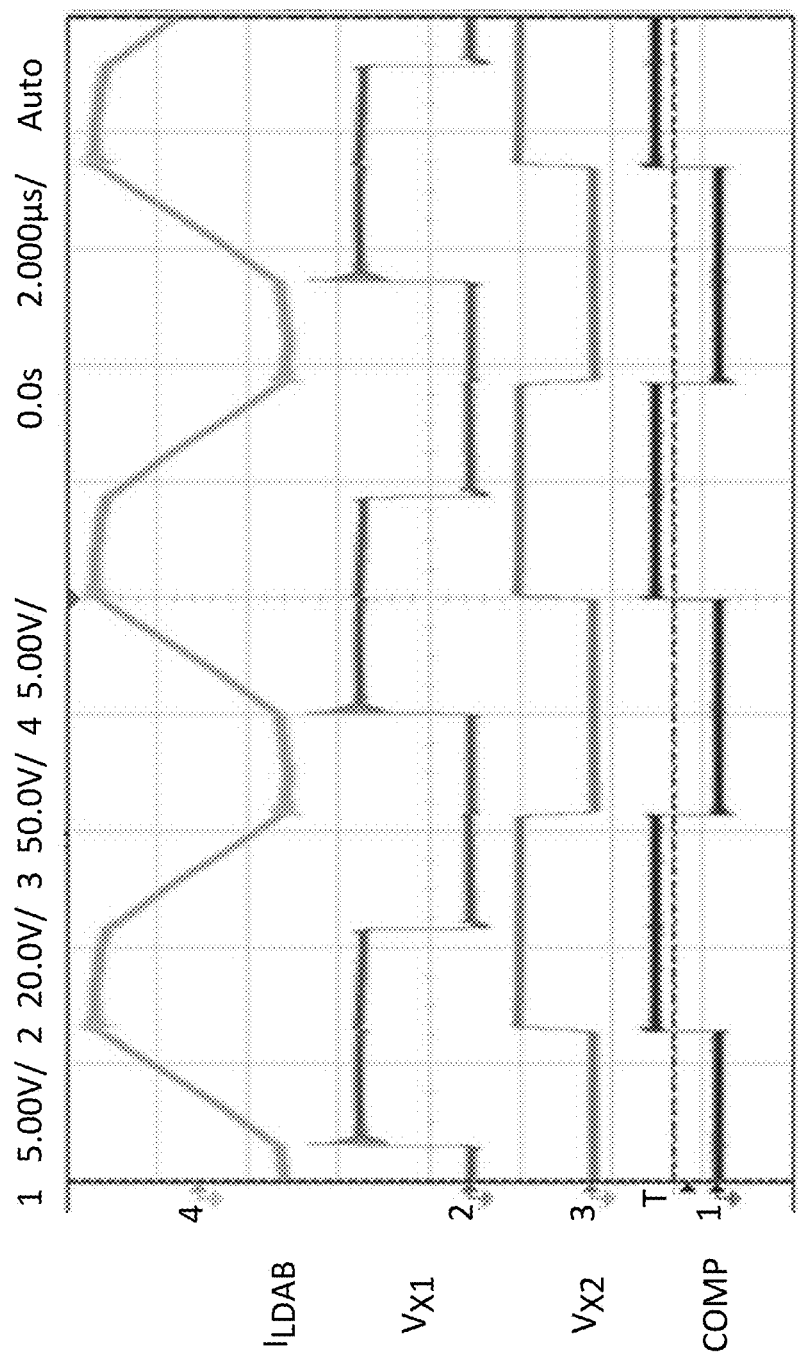
FIG. 10 is an oscilloscope trace showing steady-state $I_{LDAB}$, $V_{X1}$, $V_{X2}$ and COMP waveforms at a switching frequency of 135 kHz and output power of 140 W in an experimental implementation of FIG. 4.

FIG. 9 is a graph showing the measured delay versus core voltage ($V_{CORE}$) for a single delay element in VCO 405 of the DAB in an experimental implementation of FIG. 4. The equivalent VCO frequency varies by about 42% over the operating range of $V_{CORE}$. FIG. 10 is an oscilloscope trace showing steady-state $I_{LDAB}$, $V_{X1}$, $V_{X2}$ and COMP waveforms at a switching frequency of 135 kHz and output power of 140 W.

Figure 11:
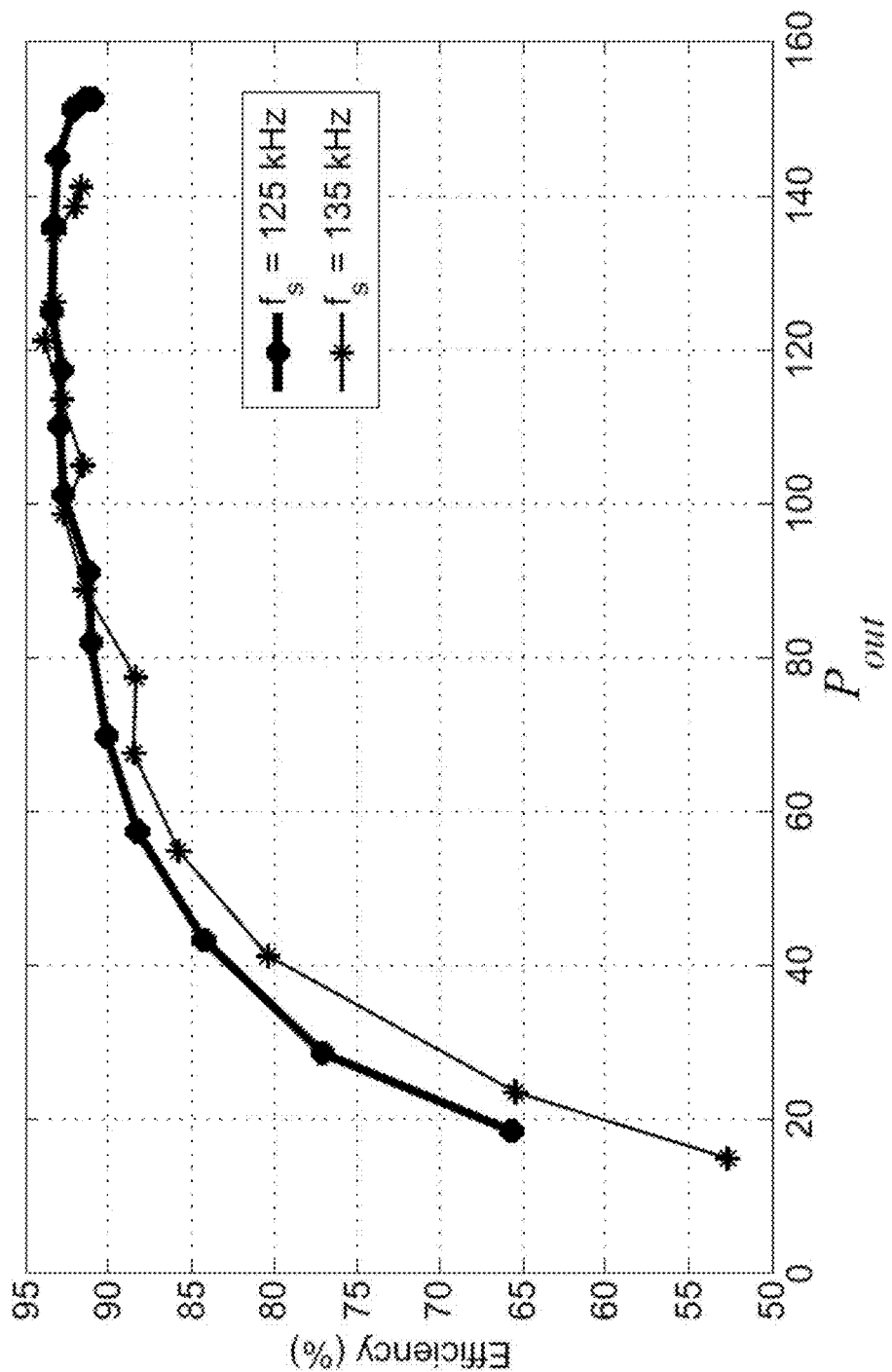
FIG. 11 is a plot of conversion efficiency of the DAB versus output power ($P_{OUT}$) for switching frequencies of 125 kHz and 135 kHz in an experimental implementation of FIG. 4.

FIG. 11 is a plot of conversion efficiency of the DAB versus output power ($P_{OUT}$) for switching frequencies of 125 kHz and 135 kHz. The DAB achieved peak efficiencies of 93.4%, and 94.5% for $f_s$=125 kHz and 135 kHz respectively. The light-load efficiency of the DAB converter could be improved using a number of techniques, including burst-mode and/or flyback-mode, for example.

Figure 12:
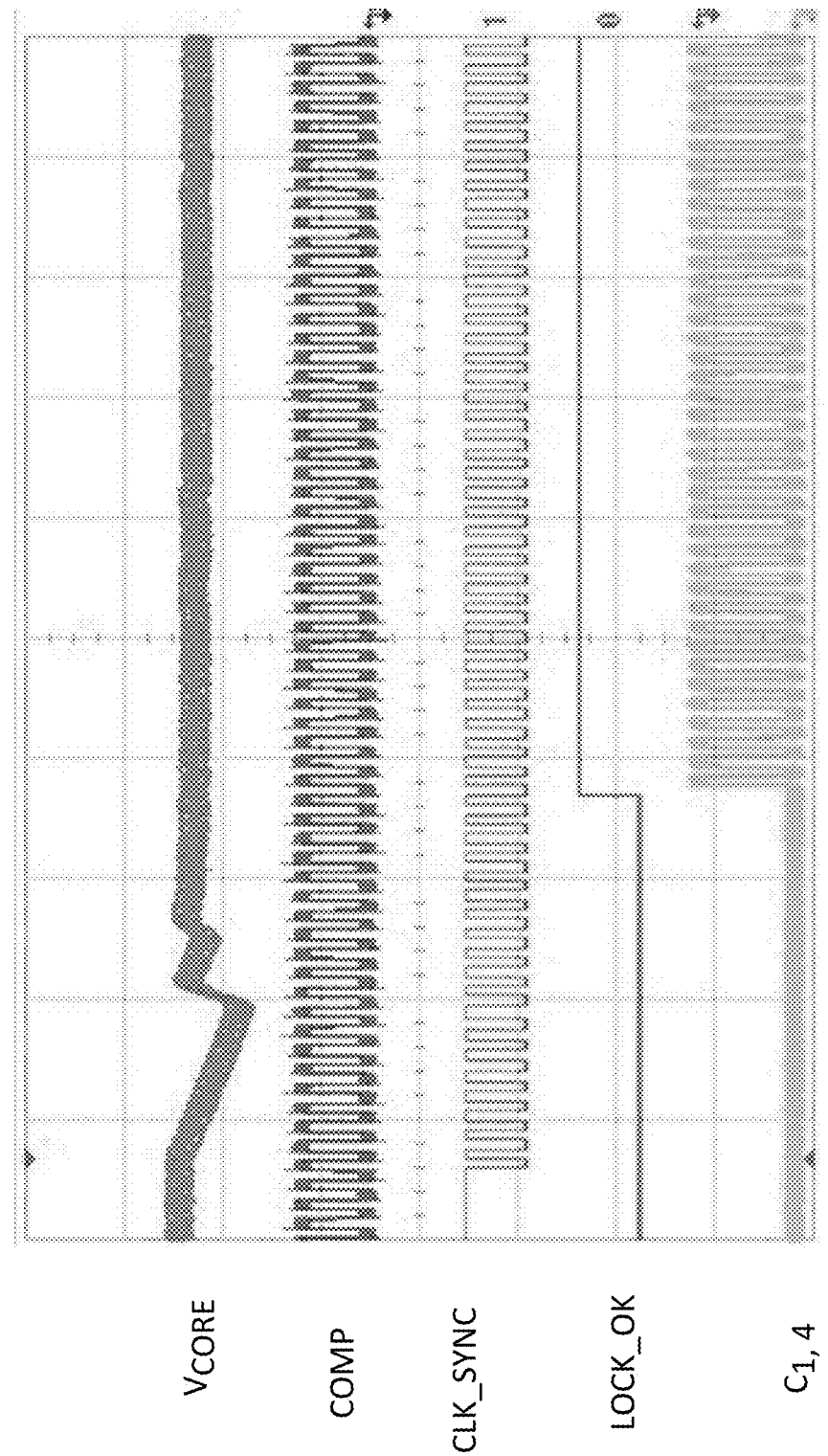
FIG. 12 is an oscilloscope trace showing signals $V_{CORE}$, COMP, CLK_SYNC, LOCK_OK and $C_{1,4}$ at startup for the PTS approach in an experimental implementation of FIG. 4.

FIG. 12 is an oscilloscope trace showing signals $V_{CORE}$, COMP, CLK_SYNC, LOCK_OK and $C_{1,4}$ at startup for the PTS approach. Initially, before the PLL locks and the LOCK_OK signal goes high, the COMP signal and the CLK_SYNC signal are not in-phase. $V_{CORE}$ changes to change the frequency of CLK_SYNC and lock the PLL. When the PLL locks the LOCK_OK signal goes high and COMP and CLK_SYNC become in-phase. The primary controller 234 then begins to generate signals $C_{1,4}$ to operate the primary side bridge.

Figure 13:
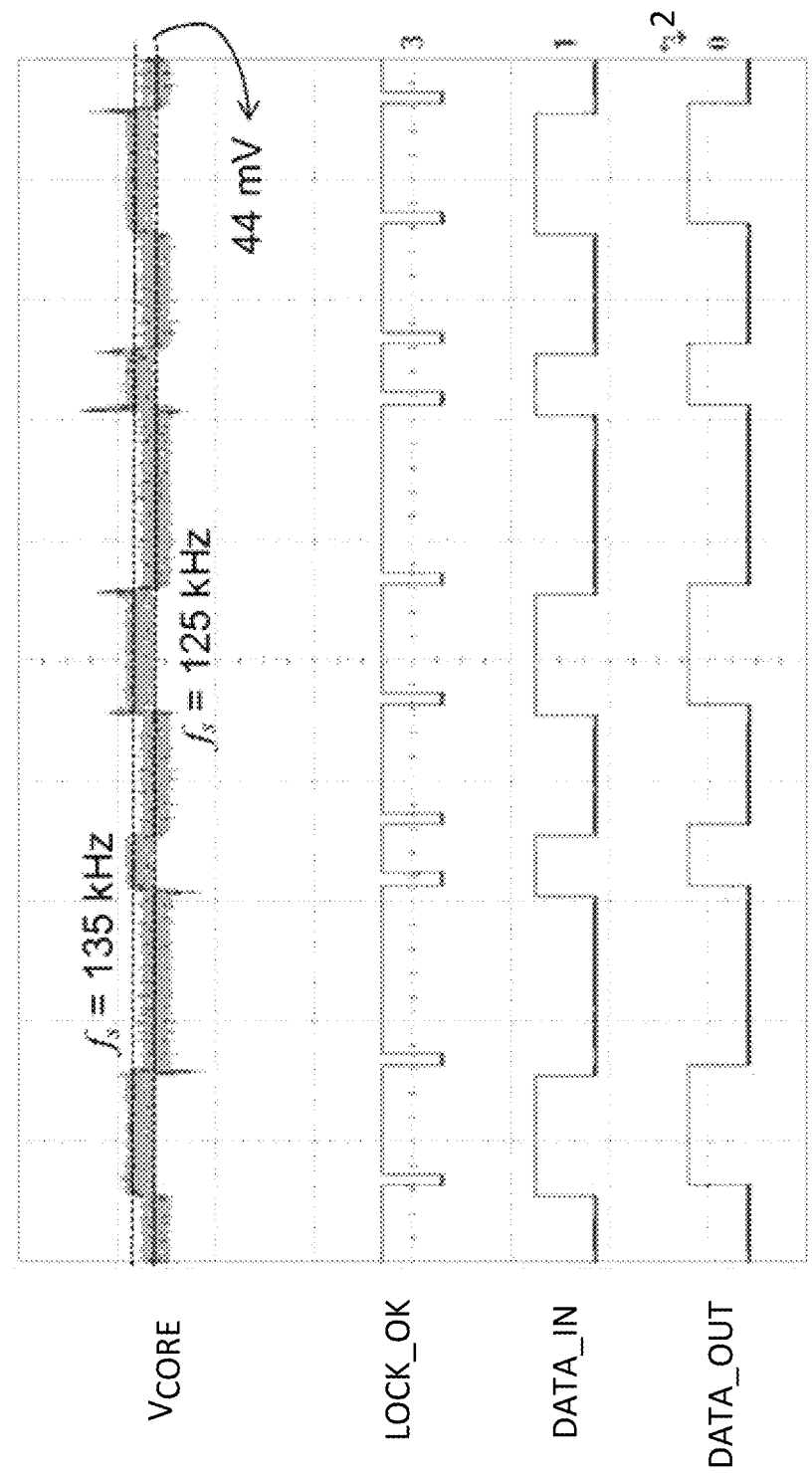
FIG. 13 is an oscilloscope trace showing a data communication operation in the PTS approach in an experimental implementation of FIG. 4.

FIG. 13 is an oscilloscope trace showing a data communication operation in the PTS approach. In this example, data is communicated by modulating the switching frequency between 135 kHz and 125 kHz. The $V_{CORE}$ voltage in the PLL changes by 44 mV to produce this frequency change in the CLK_SYNC signal. The LOCK_OK signal momentarily goes low when the frequency changes and the PLL briefly loses phase lock.

Similar or different results could be obtained under similar or different experimental conditions, or in actual implementations.

Comparison of Synchronization Approaches

The example PTS and DIS synchronization approaches shown in FIGS. 2, 4 and 6, 7 respectively, could have a reduced number of digital isolators, lower cost and higher reliability compared to the conventional solution shown in FIG. 1.

A basic comparison of the three approaches is provided in Table I below.

A PTS approach provides communication capability using frequency modulation, however the bit rate could be limited to below the switching frequency. The required bit-rate is heavily dependent on the application.

A DIS approach could offer a more flexible choice of bit-rate. In the case of a transformer based digital isolator a high transmission frequency could be desirable to reduce the size of the isolator. The PLL could operate at a higher frequency in a DIS approach than in the PTS approach. This could also provide a shorter PLL lock-time during start-up. A DIS approach could provide a synchronized high-frequency clock between both bridges, however to regulate the power flow in a DAB converter, the phase reference could be explicitly communicated from the secondary-side controller to the primary-side controller. A PTS approach does not require explicitly communicating the phase reference, since the COMP signal directly indicates the phase reference of the DAB.

TABLE I

COMPARISON OF SYNCHRONIZING APPROACHS

| Driving Approach | Conventional FIG. 1 | Power Transformer Sensing (PTS) FIG. 2 | Digital Isolator Sensing (DIS) FIG. 6 |
|---|---|---|---|
| Communication Capability | No | Yes | Yes (higher rate) |
| PLL Operation | None | Low-frequency ($f_s$) | High-frequency ($f_{ref}$ = $qf_s$) |
| Absolute Phase Ref. | NA | Available from COMP | Communicated |
| Number of Digital Isolators | 4 | 0 | 1 |
| Power Consumption | High | Lowest | Low |
| High Voltage Comparator | Not Required | Required | Not Required |

Overview

Example embodiments are described above.

In a somewhat more general sense, an isolated electronic apparatus could include a transformer that has a primary winding and a secondary winding, a first controller to control one or more first switches coupled to the primary winding, and a second controller to control one or more second switches coupled to the secondary winding. A reference signal generator, illustratively the oscillator in FIG. 2 or FIG. 4, is coupled to one of the first controller and the second controller, is to provide a first switch control reference clock signal such as CLK_REF to the one of the first controller and the second controller. A voltage sensor, illustratively the comparator in FIG. 2 or FIG. 4 which generates a signal based on changes in polarity of the sensed voltage $V_{SNS}$, is provided to sense a reflected voltage across the one of the primary winding and the secondary winding to which the other of the first controller and the second controller is coupled (i.e., on the opposite side of the transformer from the reference signal generator). A synchronizer, illustratively the PLL in FIG. 2 or FIG. 4, is coupled to the voltage sensor and to the other of the first controller and the second controller, to synchronize a second switch control reference clock signal such as CLK_SYNC for the other of the first controller and the second controller to the first switch control reference clock signal based on the reflected voltage.

In the above examples, the transformer, the first switches and the second switches form a DAB.

The synchronizer could be implemented as shown in FIG. 2 or FIG. 4, for example, using a PLL. The PLL in the examples shown includes a VCO, a counter operatively coupled to the VCO, and a phase detector operatively coupled to the counter, and the VCO in these examples is implemented using a delay line with multiple delay elements. Delay between switch control signals generated by the one of the first controller and the second controller based on the first switch control reference clock signal and switch control signals generated by the other of the first controller and the second controller based on the second switch control reference clock signal, may be controlled using the counter and the delay line.

A PV generator, including one or more PV panels and possibly other components could be coupled to the primary winding or to the secondary winding, in which case the controller that is coupled to the same winding as the PV generator could be configured to provide MPP tracking for the PV generator.

A bi-directional DAB DC/DC converter or other isolated electronics topology could be especially useful in implementations that include energy storage or could otherwise involve different directions of power flow. For example, as disclosed in the above-referenced patent applications, a DAB converter could be implemented in conjunction with power generators that include PV panels and distributed storage, and power flow could be into an energy store from an electrical grid to charge the energy store, or out of the energy store for power smoothing for example.

Thus, an isolated electronic apparatus could be coupled to an energy store. An energy store could be or include any one or more of a capacitor, a battery, and an ultracapacitor. In the case of a transformer-based isolated electronic apparatus, for example, an energy store could be coupled to the primary winding or to the secondary winding. The first controller or the second controller coupled to the winding to which the energy store is coupled could be configured to provide one or more of: State of Charge (SoC) management, charge control, and cell balancing for the energy store.

It should be appreciated that the same electronic apparatus could be coupled to multiple elements, such as an energy store and a PV generator, as disclosed in the above-referenced patent applications for example.

For data transfer embodiments, the isolated electronic apparatus could also include a modulator, coupled to the reference signal generator, to modulate the first switch control reference clock signal with data; and a detector, coupled to the synchronizer, to reconstruct the data. Any of various modulation schemes could be used including frequency modulation, for example. In this case, the modulator would be implemented using a frequency modulator to apply frequency modulation to modulate the first switch control reference clock signal with the data.

Implementation options include, for example, implementing the one of the first controller and the second controller and the reference signal generator to which it is coupled in a first FPGA, and implementing the other controller and the synchronizer in a second FPGA. In another embodiment, the one of the first controller and the second controller and the reference signal generator to which it is coupled could be implemented in a first integrated circuit, and other controller and the synchronizer could be implemented in a second integrated circuit.

In a DIS embodiment, an isolated electronic apparatus could include, on a first side of an isolation boundary, a first set of switches including multiple switches and a first controller coupled to control the first set of switches; and, on a second side of the isolation boundary, a second set of switches comprising a plurality of switches and a second controller coupled to control the second set of switches. A reference signal generator, illustratively the oscillator in FIG. 6 or FIG. 7, is coupled to the first controller on the first side of the isolation boundary, to provide a first switch control reference clock signal CLK_REF to the first controller. A digital isolator is coupled to the reference signal generator on the first side of the isolation boundary, to transfer the first switch control reference signal across the isolation boundary. A synchronizer is coupled to the digital isolator and to the second controller on the second side of the isolation boundary, to synchronize a second switch control reference clock signal CLK_SYNC for the second controller to the first switch control reference clock signal. The second controller derives switch control signals for controlling the second set of switches from the second switch control reference signal.

Even though there are multiple switches, only one digital isolator is used and the controller on the opposite side of the isolation boundary from the reference signal generation derives switch control signals from the reference signal it receives through the digital isolator. One isolator per switch control signal is not required. The digital isolator could be a transformer-based digital isolator, for example.

A transformer is disclosed herein as an example of a component that could provide the isolation boundary in a DIS embodiment. In this case one set of switches is coupled to a primary winding of the transformer, and the other set of switches is coupled to a secondary winding of the transformer. The transformer, the first set of switches, and the second set of switches could form a DAB, for example.

As noted above in respect of PTS embodiments, the reference signal generator could include an oscillator and/or the synchronizer could include a PLL in DIS embodiments.

The digital isolator could be a transformer-based digital isolator, for example, or some other type of isolator.

A PV generator could be coupled to the first set of switches or to the second set of switches, in which case the first controller or the second controller coupled to the set of switches to which the PV generator is coupled could be configured to provide MPP tracking for the PV generator.

The isolated electronic apparatus could also or instead include an energy store coupled to the first set of switches on the first side of the isolation boundary or to the second set of switches on the second side of the isolation boundary. The first controller or the second controller that is coupled to control the set of switches to which the energy store is coupled could then be configured to provide one or more of: SoC management, charge control, and cell balancing for the energy store.

For data transfer in a DIS embodiment, an encoder could be coupled to the reference signal generator and to the digital isolator on the first side of the isolation boundary, to encode the first switch control reference clock signal with data for transfer across the isolation boundary; and a decoder could be coupled to the digital isolator on the second side of the isolation boundary, to decode the data. This is shown, for example, in FIG. 7.

The first controller and the reference signal generator could be implemented in a first FPGA or integrated circuit, and the second controller and the synchronizer could be implemented in a second FPGA or integrated circuit.**

Figure 14:
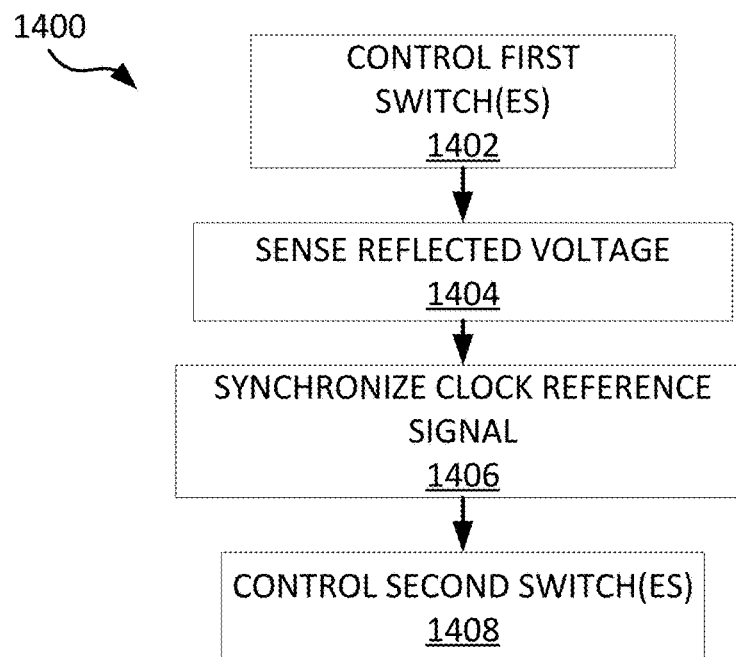
FIGS. 14 and 15 are flow charts illustrating example methods.
Figure 15:
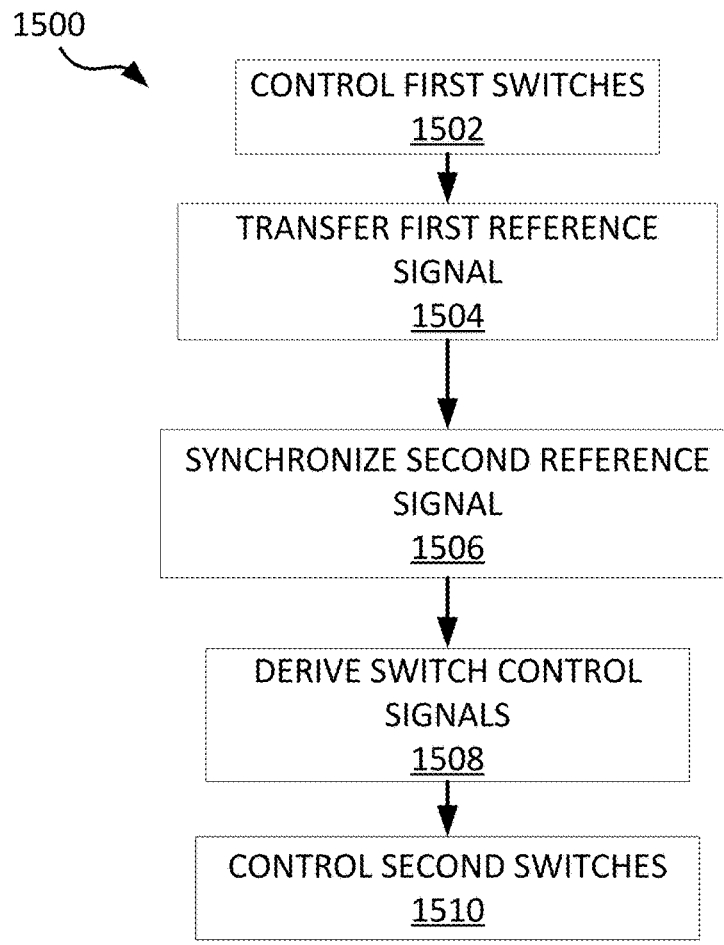

Method embodiments are also contemplated, and FIGS. 14 and 15 are flow charts illustrating example methods.

The example method 1400 in FIG. 14 involves controlling, at 1402, one or more first switches coupled to one of a primary winding and a secondary winding of a transformer, based on a first switch control reference clock signal; sensing, at 1404 a reflected voltage across the other of the primary winding and the secondary winding; synchronizing, at 1406, a second switch control reference clock signal to the first switch control reference clock signal based on the voltage; and controlling, at 1408, one or more second switches coupled to the other of the primary winding and the secondary winding based on the second switch control reference clock signal.

A DIS method 1500 (FIG. 15) could involve controlling, at 1502, a first set of switches that includes multiple switches on a first side of an isolation boundary, based on a first switch control reference clock signal generated on the first side of the isolation boundary; transferring, at 1504, the first switch control reference signal across the isolation boundary to a second side of the isolation boundary, through a digital isolator; synchronizing, at 1506, a second switch control reference clock signal to the first switch control reference clock signal; deriving, at 1508, switch control signals for controlling a second set of switches that includes multiple switches on a second side of an isolation boundary, from the second switch control reference signal; and controlling, at 1510, the second set of switches using the switch control signals.

Other method embodiments could include fewer, additional, and/or different operations performed in a similar or different order. For instance, functions supported in apparatus embodiments could be implemented in method embodiments as well.

CONCLUSION

What has been described is merely illustrative of the application of principles of embodiments of the present disclosure. Other arrangements and methods can be implemented by those skilled in the art.

For example, any divisions of function in the drawings are not intended to be limiting or exhaustive. Other embodiments could include additional, fewer, and/or different components than shown. Similarly, other method embodiments could include additional, fewer, and/or different operations performed in an order similar to or different from what is described above.

Designations such as primary/secondary, first/second, input/output and the like are not intended to be limiting. Switch control reference signal generation could be provided on either side of a transformer or other isolation boundary and a switch control reference signal for the other side of the boundary could be synchronized with the generated reference signal as disclosed herein. In a bi-directional converter, for instance, either side could be considered the input or the output depending on the direction of conversion. The present disclosure and claims should be interpreted accordingly.

The present disclosure is also not intended to be limited to the specific example of a two-winding transformer. There could be more than two windings, each with its own isolated switches and respective controller. A reference signal generator could be provided for only one of the controllers, and switching of other sets of one or more switches coupled to other windings could be synchronized as disclosed herein. More generally, there could be multiple isolation boundaries and/or multiple isolated domains between which switching could be synchronized.

Also, although described primarily in the context of methods and systems, other implementations are also contemplated, as instructions stored on a non-transitory computer-readable medium, for example.

REFERENCES

[1] F. Krismer and J. Kolar, "Accurate small-signal model for the Digital Control of an Automotive Bidirectional Dual Active Bridge," *IEEE Transactions on Power Electronics*, vol. 24, no. 12, pp. 2756-2768, 2009.

[2] H. Qin and J. Kimball, "Generalized average modeling of dual active bridge dc-dc converter," *IEEE Transactions on Power Electronics*, vol. 27, no. 4, pp. 2078-2084, 2012.

[3] A. Thaduri, A. Verma, G. Vinod, and R. Gopalan, "Reliability prediction of optocouplers for the safety of digital instrumentation,"in 2011 *IEEE International Conference on Quality and Reliability (ICQR)*, September 2011, pp. 491-495.

[4] P. Jacob, G. Nicoletti, and M. Rutsch, "Reliability failures in small optocoupling and dc/dc converter devices," in 2006. 13*th International Symposium on the Physical and Failure Analysis of Integrated Circuits*, July 2006, pp. 167-170.

[5] S. Hui, S. C. Tang, and H. -H. Chung, "Optimal Operation of Coreless PCB Transformer-Isolated Gate Drive Circuits with Wide Switching Frequency Range," *Power Electronics, IEEE Transactions on*, vol. 14, no. 3, pp. 506-514, May 1999.

[6] L. Peng, R. Wu, X. Fang, Y. Toyoda, M. Akahane, M. Yamaji, H. Sumida, and J. Sin, "A Novel 3D TSC Transformer Technology for Digital Isolator Gate Driver Applications," in *Power Semiconductor Devices and ICs (ISPSD)*, 2013 25*th International Symposium on*, May 2013, pp. 69-72.

[7] Y. Moghe, A. Terry, and D. Luzon, "Monolithic 2.5 kv rms, 1.8v; 3.3v Dual-channel 640 mbps Digital Isolator in 0.5 um SOS," in *SOI Conference (SOI)*, 2012 *IEEE International*, October 2012, pp. 1-2.

[8] S. Kaeriyama, S. Uchida, M. Furumiya, M. Okada, T. Maeda, and M. Mizuno, "A 2.5 kV Isolation 35 kV/uS CMR 250 Mbps Digital Isolator in Standard CMOS with a Small Transformer Driving Technique," *Solid-State Circuits, IEEE Journal of*, vol. 47, no. 2, pp. 435-443, February 2012.

[9] L. Peng, R. Wu, X. Fang, Y. Toyoda, M. Akahane, M. Yamaji, H. Sumida, and J. Sin, "A Simple Low Cost Monolithic Transformer for High-voltage Gate Driver Applications," *Electron Device Letters, IEEE*, vol. 35, no. 1, pp. 108-110, January 2014.

[10] T. V. Nguyen, J. -C. Crebier, and P. -O. Jeannin, "Design and Investigation of an Isolated Gate Driver using CMOS integrated circuit and HF Transformer for Interleaved DC/DC Converter," *Industry Applications, IEEE Transactions on*, vol. 49, no. 1, pp. 189-197, January 2013.

[11] S. Nagai, T. Fukuda, N. Otsuka, D. Ueda, N. Negoro, H. Sakai, T. Ueda, and T. Tanaka, "A One-chip Isolated Gate Driver with an Electromagnetic Resonant Coupler using a SPDT Switch," in *Power Semiconductor Devices and ICs (ISPSD), 2012 24th International Symposium on*, June 2012, pp. 73-76.

[12] K. Muhammad and D.-C. Lu, "Magnetically Isolated Gate Driver with Leakage Inductance Immunity," *Power Electronics, IEEE Transactions on*, vol. 29, no. 4, pp. 1567-1572, April 2014.

[13] B. Chen, "iCoupler products with isoPower Technology: Signal and power transfer across Isolation Barrier using Microtransformers," Analog Devices Inc., 2006, available http://www.analog.com/static/imported-files/overviews/isoPower.pdf.

[14] D. Costinett, M. Rodriguez, and D. Maksimovic, "Simple Digital Pulse Width Modulator under 100 pS Resolution Using General-purpose FPGAs," *Power Electronics, IEEE Transactions on*, vol. 28, no. 10, pp. 4466-4472, October 2013.

[15] O. Trescases, G. Wei, and W.-T. Ng, "A Segmented Digital Pulse Width Modulator with Self-calibration for Low-power SMPS," in *Electron Devices and Solid-State Circuits, 2005 IEEE Conference on*, December 2005, pp. 367-370.

[16] W. Stefanutti, S. Saggini, P. Mattavelli, and M. Ghioni, "Power line Communication in Digitally Controlled DC-DC Converters Using Switching Frequency Modulation," *Industrial Electronics, IEEE Transactions on*, vol. 55, no. 4, pp. 1509-1518, April 2008.

[17] Y.-C. Wang, Y.-C. Wu, and T.-L. Lee, "Design and Implementation of a Bidirectional Isolated Dual-Active-Bridge-Based DC/DC Converter with Dual-phase-shift Control for Electric Vehicle Battery," in *2013 IEEE Energy Conversion Congress and Exposition (ECCE)*, September 2013, pp. 5468-5475.

[18] D. Costinett, K. Hathaway, M. Rehman, M. Evzelman, R. Zane, Y. Levron, and D. Maksimovic, "Active balancing system for electric vehicles with incorporated low voltage bus," in 2014 *Twenty-Ninth Annual IEEE Applied Power Electronics Conference and Exposition (APEC)*, March 2014, pp. 3230-3236.

[19] S. Poshtkouhi, M. Fard, H. Hussein, L. Dos Santos, O. Trescases, M. Varlan, and T. Lipan, "A Dual-Active-Bridge Based Bi-directional Micro-inverter with Integrated Short-term Li-ion Ultra-capacitor Storage and Active Power Smoothing for Modular PV systems," in *Applied Power Electronics Conference and Exposition (APEC), 2014 Twenty-Ninth Annual IEEE*, March 2014, pp. 643-649.

What is claimed is:

1. An isolated electronic apparatus comprising:
a transformer comprising a primary winding and a secondary winding;
a first controller to control one or more first switches coupled to the primary winding;
a second controller to control one or more second switches coupled to the secondary winding;
a reference signal generator, coupled to one of the first controller and the second controller, to provide a first switch control reference clock signal to the one of the first controller and the second controller;
a voltage sensor to sense a reflected voltage across the one of the primary winding and the secondary winding to which the other of the first controller and the second controller is coupled;
a synchronizer, coupled to the voltage sensor and to the other of the first controller and the second controller, to synchronize a second switch control reference clock signal for the other of the first controller and the second controller to the first switch control reference clock signal based on the reflected voltage, the synchronizer comprising a Phase Locked Loop (PLL).

2. The isolated electronic apparatus of claim 1, the transformer, the one or more first switches, and the one or more second switches comprising a Dual Active Bridge (DAB).

3. The isolated electronic apparatus of claim 1, the reference signal generator comprising an oscillator.

4. The isolated electronic apparatus of claim 1, the voltage sensor comprising a comparator to generate a signal based on changes in polarity of the reflected voltage.

5. The isolated electronic apparatus of claim 1, the PLL comprising a Voltage Controlled Oscillator (VCO), a counter operatively coupled to the VCO, and a phase detector operatively coupled to the counter.

6. The isolated electronic apparatus of claim 5, wherein the VCO comprises a delay line with a plurality of delay elements.

7. The isolated electronic apparatus of claim 6, wherein delay between switch control signals generated by the one of the first controller and the second controller based on the first switch control reference clock signal and switch control signals generated by the other of the first controller and the second controller based on the second switch control reference clock signal, is controlled using the counter and the delay line.

8. The isolated electronic apparatus of claim 1, further comprising:
a PhotoVoltaic (PV) generator coupled to the primary winding or to the secondary winding.

9. The isolated electronic apparatus of claim 8, the first controller or the second controller coupled to the winding to which the PV generator is coupled being configured to provide Maximum Power Point (MPP) tracking for the PV generator.

10. The isolated electronic apparatus of claim 1, further comprising:
an energy store coupled to the primary winding or to the secondary winding.

11. The isolated electronic apparatus of claim 1,
the one of the first controller and the second controller and the reference signal generator being implemented in a first integrated circuit,
the other of the first controller and the second controller and the synchronizer being implemented in a second integrated circuit.

12. An isolated electronic apparatus comprising:
a transformer comprising a primary winding and a secondary winding;
a first controller to control one or more first switches coupled to the primary winding;
a second controller to control one or more second switches coupled to the secondary winding;
a reference signal generator, coupled to one of the first controller and the second controller, to provide a first switch control reference clock signal to the one of the first controller and the second controller;

a voltage sensor to sense a reflected voltage across the one of the primary winding and the secondary winding to which the other of the first controller and the second controller is coupled;

a synchronizer, coupled to the voltage sensor and to the other of the first controller and the second controller, to synchronize a second switch control reference clock signal for the other of the first controller and the second controller to the first switch control reference clock signal based on the reflected voltage;

a modulator, coupled to the reference signal generator, to modulate the first switch control reference clock signal with data;

a detector, coupled to the synchronizer, to reconstruct the data.

13. The isolated electronic apparatus of claim 12, the modulator comprising a frequency modulator to apply frequency modulation to modulate the first switch control reference clock signal with the data.

14. A method comprising:

controlling one or more first switches coupled to one of a primary winding and a secondary winding of a transformer, based on a first switch control reference clock signal;

sensing a reflected voltage across the other of the primary winding and the secondary winding;

synchronizing a second switch control reference clock signal to the first switch control reference clock signal based on the reflected voltage;

controlling one or more second switches coupled to the other of the primary winding and the secondary winding based on the second switch control reference clock signal, the synchronizing comprising synchronizing the second switch control reference clock signal to the first switch control reference clock signal based on changes in polarity of the reflected voltage.

15. The method of claim 14, implemented in conjunction with a PhotoVoltaic (PV) generator coupled to the primary winding or to the secondary winding, controlling the one or more first switches or controlling the one or more second switches comprising controlling the one or more switches coupled to the winding to which the PV generator is coupled to provide Maximum Power Point (MPP) tracking for the PV generator.

16. A method comprising:

controlling one or more first switches coupled to one of a primary winding and a secondary winding of a transformer, based on a first switch control reference clock signal;

sensing a reflected voltage across the other of the primary winding and the secondary winding;

synchronizing a second switch control reference clock signal to the first switch control reference clock signal based on the reflected voltage;

controlling one or more second switches coupled to the other of the primary winding and the secondary winding based on the second switch control reference clock signal, the synchronizing comprising:

using a Phase Locked Loop (PLL), the PLL comprising a Voltage Controlled Oscillator (VCO), a counter operatively coupled to the VCO, and a phase detector operatively coupled to the counter, the VCO comprising a delay line with a plurality of delay elements;

controlling, using the counter and the delay line, delay between first switch control signals generated to control the one or more first switches and second switch control signals generated to control the one or more second switches.

17. A method comprising:

controlling one or more first switches coupled to one of a primary winding and a secondary winding of a transformer, based on a first switch control reference clock signal;

sensing a reflected voltage across the other of the primary winding and the secondary winding;

synchronizing a second switch control reference clock signal to the first switch control reference clock signal based on the reflected voltage;

controlling one or more second switches coupled to the other of the primary winding and the secondary winding based on the second switch control reference clock signal;

modulating the first switch control reference clock signal with data;

reconstructing the data in a circuitry portion coupled to the other of the primary winding and the secondary winding based on the reflected voltage.

18. The method of claim 17, the modulating comprising applying frequency modulation to modulate the first switch control reference clock signal with the data.

19. An isolated electronic apparatus comprising:

on a first side of an isolation boundary, a first set of switches comprising a plurality of switches and a first controller coupled to control the first set of switches;

on a second side of the isolation boundary, a second set of switches comprising a plurality of switches and a second controller coupled to control the second set of switches;

a reference signal generator, coupled to the first controller on the first side of the isolation boundary, to provide a first switch control reference clock signal to the first controller;

a digital isolator, coupled to the reference signal generator on the first side of the isolation boundary, to transfer the first switch control reference signal across the isolation boundary;

a synchronizer, coupled to the digital isolator and to the second controller on the second side of the isolation boundary, to synchronize a second switch control reference clock signal for the second controller to the first switch control reference clock signal, the second controller deriving switch control signals for controlling the second set of switches from the second switch control reference signal.

* * * * *